United States Patent
Kurotsu

(10) Patent No.: US 7,916,334 B2
(45) Date of Patent: Mar. 29, 2011

(54) PRINT MANAGING APPARATUS, PRINT MANAGING METHOD, AND COMPUTER PROGRAM

(75) Inventor: Noriyoshi Kurotsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 11/958,357

(22) Filed: Dec. 17, 2007

(65) Prior Publication Data

US 2008/0151298 A1    Jun. 26, 2008

(30) Foreign Application Priority Data

Dec. 20, 2006   (JP) ................................ 2006-343122

(51) Int. Cl.
  *G06F 15/00*   (2006.01)
  *G06F 3/12*    (2006.01)
  *G06K 1/00*    (2006.01)
(52) U.S. Cl. ..................................... 358/1.15; 358/1.13
(58) Field of Classification Search .................. 358/1.1, 358/1.15, 1.13, 1.14, 1.16
See application file for complete search history.

(56) References Cited

U.S. PATENT DOCUMENTS

| 7,239,410 B2 | 7/2007 | Matsueda |
| 7,336,909 B2 * | 2/2008 | Yamazaki ........................ 399/9 |
| 7,510,112 B2 * | 3/2009 | Ueda et al. .................... 235/375 |
| 2002/0030850 A1 | 3/2002 | Matsueda |
| 2004/0156069 A1 | 8/2004 | Kurotsu et al. |
| 2004/0160613 A1 | 8/2004 | Kurotsu et al. |
| 2006/0023255 A1 | 2/2006 | Kurotsu |

FOREIGN PATENT DOCUMENTS

JP    2002-091720    3/2002

* cited by examiner

*Primary Examiner* — Douglas Q Tran
(74) *Attorney, Agent, or Firm* — Fitzpatrick, Cella, Harper & Scinto

(57) ABSTRACT

A print processing result can be more certainly obtained while reducing a processing load of a printer. A print server forms a job tracing ID for a print job whose processing result is to be confirmed and transmits to a network printer. Thereafter, when the print job is formed in the network printer, the print server obtains information of the print job from the network printer. The job tracing ID has been allocated to the information of the print job. If it is decided based on the job tracing ID included in the information of the print job that the obtained information of the print job is not the information of the print job which is being traced, the print server determines that the print job which is being traced has been extinguished. The print server inquires the processing result of the extinguished print job from the network printer by using the job tracing ID.

12 Claims, 17 Drawing Sheets

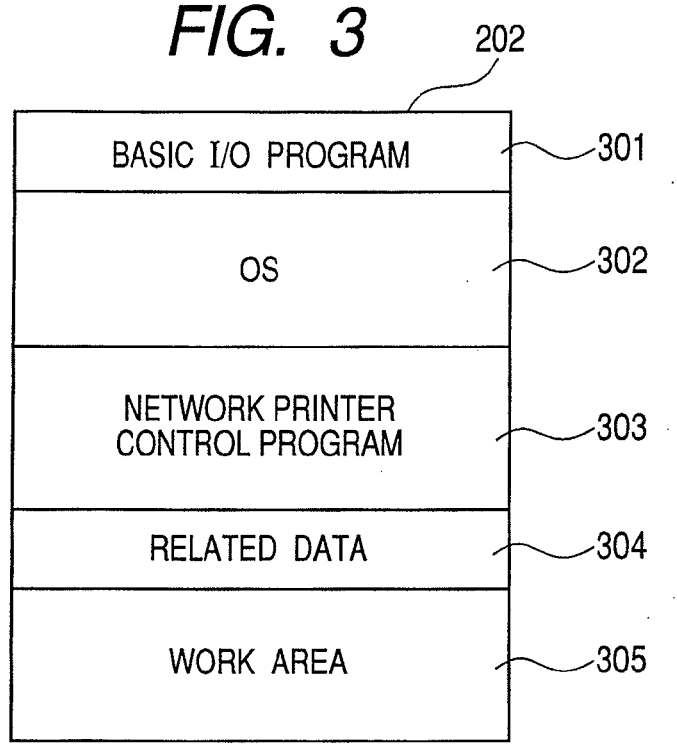
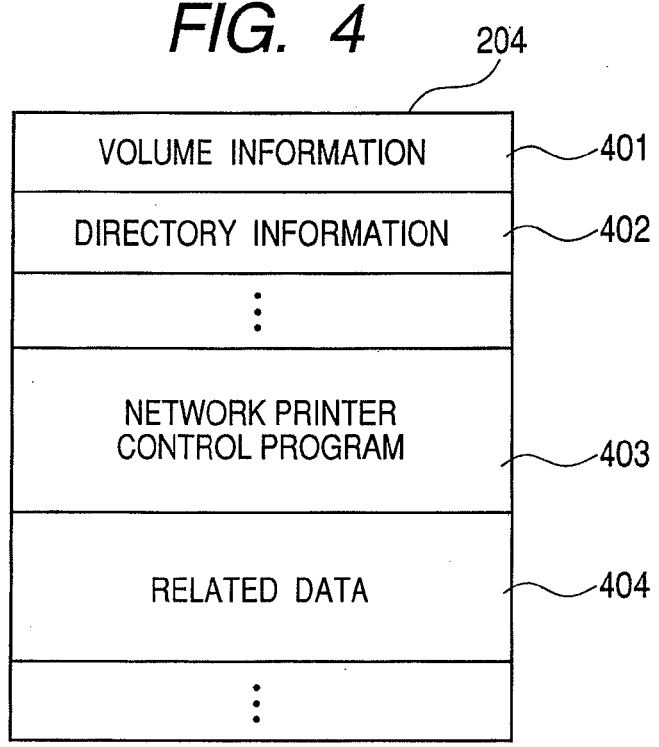

| JOB ID 81 | JOB TRACING ID 82 | INTRA-APPARATUS JOB ID 83 | STATE OF JOB 84 | JOB ATTRIBUTES (USER NAME, FILE NAME, ETC.) 85 |
|---|---|---|---|---|
| 1 | 834fbf07-86d3-4226-93df-20f36c299844 | 0x11180 | DURING PRINTING | kayama, SPECIFICATION.pdf, 1 COPY |
| 2 | 0fcb1cc7-6e14-411e-9638-fd8f57c9ca3a | | | Kurotsu, sample.pdf, 2 COPIES |

| | | 1001 / 1002 / 1005a / 1005 |
|---|---|---|
| JOB ID | | 2 |
| JOB TRACING ID | | 0fcb1cc7-6e14-411e-9638-fd8f57c9ca3a |
| CONTENTS URL | | http://pc-la/ID-100.pdf |
| JOB NAME | | sample.pdf |
| PRINTING METHOD | | DUPLEX PRINTING |
| THE NUMBER OF COPIES | | 2 COPIES |
| SHEET TYPE | | PLAIN PAPER |
| SHEET SIZE | | A4 |
| THE TOTAL NUMBER OF PAGES | | UNKNOWN |
| EXCEPTIONAL SETTING | 1ST AND 2ND PAGES | SHEET TYPE | THICK PAPER |
| | 23RD AND 24TH PAGES | SHEET TYPE | THICK PAPER |

FIG. 11

| RECEPTION NO. 1101 | JOB TRACING ID 1102 | INTRA-APPARATUS JOB ID 1103 | STATE OF JOB 1104 | JOB ATTRIBUTES (USER NAME, FILE NAME, ETC.) 1105 |
|---|---|---|---|---|
| 1101 | 834fbf07-86d3-4226-93df-20f36c299844 | 0x11180 | DURING PRINTING | kayama, SPECIFICATION.pdf, 1 COPY |
| 1102 | 0fcb1cc7-6e14-411e-9638-fd8f57c9ca3a | 0x11181 | DURING RECEPTION | Kurotsu, sample.pdf, 2 COPIES |

FIG. 16

| 1601 | 1602 | 1603 | 1604 | 1605 |
|---|---|---|---|---|
| PACKET TYPE | REQ ID | INTRA-APPARATUS JOB ID | JOB TRACING ID | STATE OF JOB |
| EVENT | 0 | 0x11182 | 0fcb1cc7-6e14-411e-9638-fd8f57c9ca3a | WAIT FOR PRINTING |

FIG. 17A

| 1701 | 1702 | 1703 | 1704 | 1705 | 1706 | 1707 | 1708 | 1709 |
|---|---|---|---|---|---|---|---|---|
| PACKET TYPE | REQ ID | OP CODE | THE NUMBER OF OBTAINED JOBS | INTRA-APPARATUS JOB ID | INTRA-APPARATUS JOB ID | THE NUMBER OF OBTAINED INFORMATION | ATTRIBUTE 1 | ATTRIBUTE 2 |
| REQUEST | 1 | GET | 2 | 0x11180 | 0x11182 | 2 | STATE OF JOB | JOB TRACING ID |

FIG. 17B

| 1701 | 1702 | 1703 | 1704 | 1705 | 1707 | 1708' | 1709' | 1706 | 1707 | 1708' | 1709' |
|---|---|---|---|---|---|---|---|---|---|---|---|
| PACKET TYPE | REQ ID | OP CODE | THE NUMBER OF OBTAINED JOBS | INTRA-APPARATUS JOB ID | THE NUMBER OF OBTAINED INFORMATION | STATE OF JOB | JOB TRACING ID | INTRA-APPARATUS JOB ID | THE NUMBER OF OBTAINED INFORMATION | STATE OF JOB | JOB TRACING ID |
| RESPONSE | 1 | GET | 2 | 0x11182 | 2 | DURING PRINTING | 0fcb1cc7-6e14-411e-9638-fd8f57c9ca3a | 0x11182 | 2 | DURING PRINTING | 0fcb1cc7-6e14-411e-9638-fd8f57c9ca3a |

FIG. 18A

| 1801 | 1802 | 1803 | 1804 |
|---|---|---|---|
| PACKET TYPE | REQ ID | OP CODE | JOB TRACING ID |
| REQUEST | 2 | TRACE | 834fbf07-86d3-4226-93df-20f36c299844 |

FIG. 18B

| 1801 | 1802 | 1803 | 1804 | 1805 | 1806 | 1807 |
|---|---|---|---|---|---|---|
| PACKET TYPE | REQ ID | OP CODE | JOB TRACING ID | INTRA-APPARATUS JOB ID | RESULT OF JOB | THE NUMBER OF PRINTED SHEETS |
| RESPONSE | 2 | TRACE | 834fbf07-86d3-4226-93df-20f36c299844 | 0x11180 | OK | 3 SHEETS |

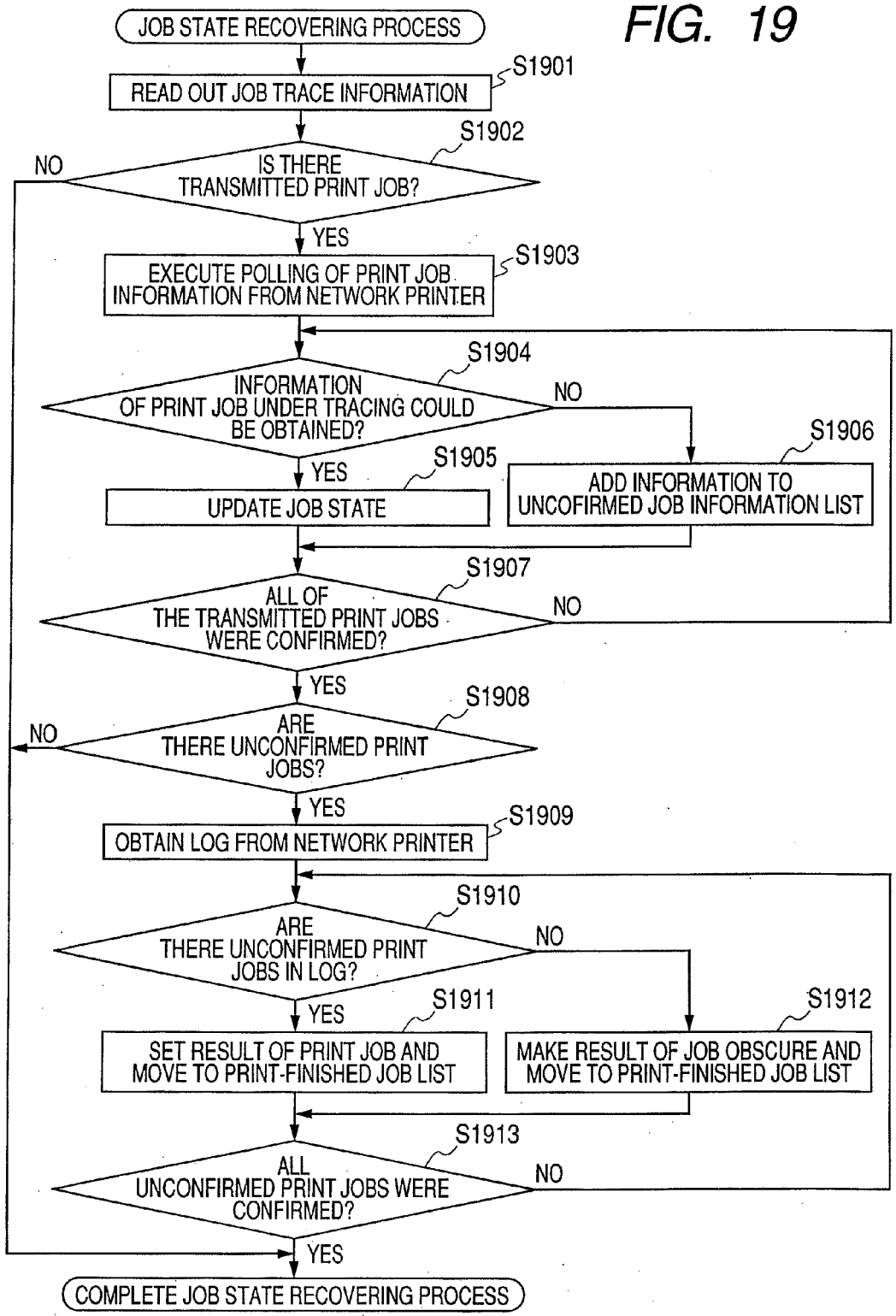

FIG. 20

| PROCESSING RESULT INQUIRING COMMAND | REQUIRED TIME | THE NUMBER OF INFORMATION WHICH CAN BE OBTAINED |
|---|---|---|
| TRACE | 1 SECOND | 1 |
| LOG | 10 SECONDS | 100 |

PRINT MANAGING APPARATUS, PRINT MANAGING METHOD, AND COMPUTER PROGRAM

BACKGROUND OF THE INVENTION

1. Field of the Invention

The present invention relates to a print managing apparatus, a print managing method, and a computer program. More particularly, the invention is suitable when it is used to confirm a result of a printing process.

2. Description of the Related Art

In commercial printing such as a POD (Print On Demand) system, it is necessary to strictly confirm a result of a print output, the number of recording sheets, and the like. For this purpose, such a technique has been disclosed (Japanese Patent Application Laid-Open No. 2002-91720) whereby a result of a printing process is held as a log in a printing apparatus (hereinbelow, simply referred to as a printer) and a print server confirms the log held in the printer.

However, according to the foregoing related art, since the print server requests and refers to the log held in a hard disk provided for the printer, although the print result can be certainly managed, such a process applies a load on the printer. Generally, a speed of an access accompanied with the writing and reading of data into/from the hard disk is lower than an accessing speed of a RAM or the like and a processing load in such an access is larger. Such a frequent access to the hard disk deteriorates performance of the printer. In other words, if the print server frequently obtains the log in order to accurately confirm the print completion result in the printer, there is a risk of exerting an influence on the printing process which is being executed by the printer.

There is also a case where there is a necessity to reactivate the print server which is monitoring the printing during the printing process, or a communication error occurs between the printer and the print server, or the printer which is executing the printing process is reactivated, or the like. In such cases, there is a risk that a print control program in the print server loses a print job which is being monitored and cannot confirm a processing result of the print job.

Further, in the case where the execution of the printing based on print data existing in the printer is instructed by a computer such as a print server or the like away from the printer, such a print server does not have a unit for managing the print job based on the print data. Consequently, there is also such an inconvenience that the print processing result cannot be managed.

SUMMARY OF THE INVENTION

The invention is made in consideration of the problems as mentioned above and intends to enable a print processing result to be more certainly obtained while reducing a processing load of a printer.

According to the invention, there is provided a print managing apparatus which can communicate with a printing apparatus which can notify an outside of a state of each of print jobs that are managed in a volatile memory and histories of the print jobs that are managed in a non-volatile memory, comprising: a discriminating unit configured to discriminate whether or not a processing result of the print job could be obtained based on the state notification showing the state of each of the print jobs managed in the volatile memory; and a tracing unit configured to obtain the job history as a processing result of each of the print jobs managed in the non-volatile memory if it is determined by the discriminating unit based on the state notification that the processing result of each of the print jobs cannot be obtained.

Other objects, construction, and effect of the invention will be obvious from the following detailed description and drawings.

According to the invention, the print processing result can be certainly obtained while reducing the processing burden of the printer.

Further features of the present invention will become apparent from the following description of exemplary embodiments with reference to the attached drawings.

BRIEF DESCRIPTION OF THE DRAWINGS

FIG. 3 illustrates an embodiment of the invention and is a diagram illustrating an example of a memory map in a RAM.

FIG. 4 illustrates an embodiment of the invention and is a diagram illustrating an example of a memory map in a floppy disk (FD).

FIG. 10 illustrates an embodiment of the invention and is a diagram illustrating an example of a job ticket.

FIG. 11 illustrates an embodiment of the invention and is a diagram illustrating an example of a job management table.

FIG. 16 illustrates an embodiment of the invention and is a diagram illustrating an example of information of a job state change event.

FIGS. 17A and 17B illustrate an embodiment of the invention and are diagrams illustrating an example of a command (job attribute polling command) which is used in a job attribute polling process and contents of a response to the job attribute polling command.

FIGS. 18A and 18B illustrate an embodiment of the invention and are diagrams illustrating an example of a command (processing result inquiring command) which is used in an inquiry about a processing result of the print job and contents of a response to the processing result inquiring command.

FIG. 19 illustrates an embodiment of the invention and is a flowchart for describing an example of a print job state recovering process.

FIG. 20 illustrates an embodiment of the invention and is a diagram illustrating an example of a relation between the processing result inquiring command and characteristics information.

DESCRIPTION OF THE EMBODIMENTS

First Embodiment

The first embodiment of the invention will now be described with reference to the drawings.

Figure 1:
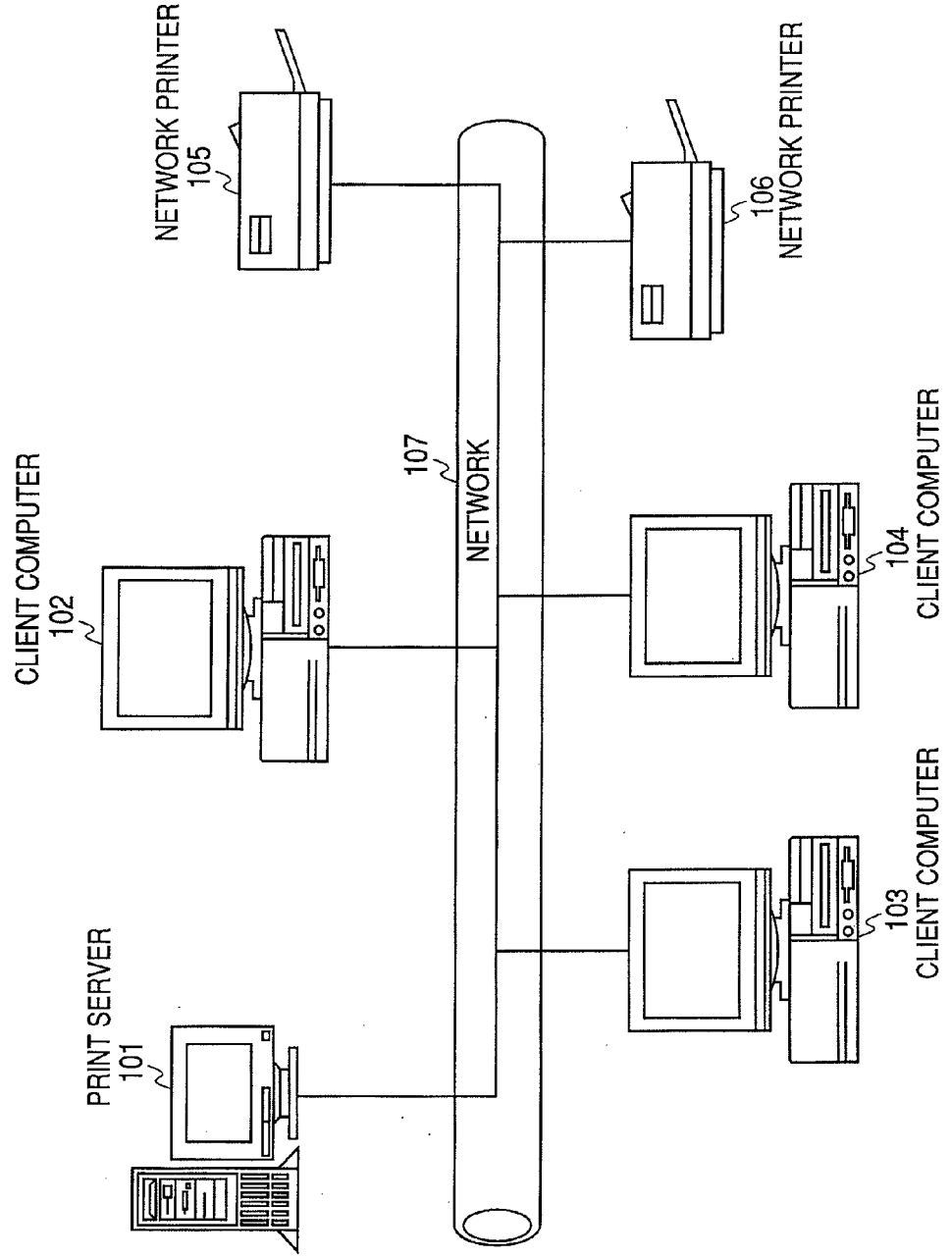
FIG. 1 illustrates an embodiment of the invention and is a block diagram illustrating an example of a construction of a print managing system.

FIG. 1 is a block diagram illustrating an example of a construction of a print managing system.

In FIG. 1, client computers 102 to 104 are information processing apparatuses and are connected to a network 107 through a network cable such as an Ethernet (registered trademark) or the like. Naturally, a communicating medium for allowing the client computers 102 to 104 to communicate with an external apparatus is not limited to the network 107 but a communicating interface other than the network 107 can be applied as a communicating medium.

Each of the client computers 102 to 104 can execute various programs such as an application program and the like. A printer driver having a function of converting print data into printer languages corresponding to network printers 105 and 106 has been installed in each of the client computers 102 to 104. It is assumed that a plurality of printer drivers can be registered into each of the client computers 102 to 104.

The case where the three client computers 102 to 104 have been provided for the print managing system is illustrated as an example in FIG. 1. However, the number of client computers is not limited to 3 but may be an arbitrary number of 1 or more.

A print server 101 as an example of a print managing apparatus is an information processing apparatus and is connected to the network 107 through the network cable. The print server 101 accumulates files which are used in the network 107 or monitors a usage state of the network 107. The print server 101 manages a plurality of network printers 105 and 106 connected to the network 107.

The client computers 102 to 104 and the print server 101 can be constructed by storing print control programs for different kinds of control in general information processing apparatuses so that those programs can be executed, respectively.

In the case of using the general information processing apparatus as a print server 101, it is also possible to allow the print server 101 to simultaneously have the functions of the client computers 102 to 104.

When print jobs including print data are received from the client computers 102 to 104, the print server 101 stores the print jobs into a storing medium and outputs the print jobs stored in the storing medium to the network printers 105 and 106 so as to print. When print jobs which do not include the print data are received from the client computers 102 to 104, the print server 101 manages a printing order of the client computers 102 to 104. The print server 101 sends a notification showing a transmission permission of the print job including the print data to one of the client computers 102 to 104 based on the managed printing order. Further, the print server 101 obtains the status of each of the network printers 105 and 106 and various kinds of information of the print jobs and notifies the client computers 102 to 104 of the obtained various kinds of information.

The network printers 105 and 106 as an example of printers are connected to the network 107 through a network interface. When the print jobs including the print data are transmitted from the client computers 102 to 104, the network printers 105 and 106 analyze the print job and convert the print data into dot images page by page. The network printers 105 and 106 print every page of the print data converted into the dot images (the print job is executed). The network printers 105 and 106 can provide a managing function of the print jobs specified by ISO10175 (DPA) to at least one of the print server 101 and the client computers 102 to 104. DPA is an abbreviation of "Document Printing Application".

It is also possible to construct the system in such a manner that the network printers 105 and 106 or their network interface cards have functions which are executed by the print server 101 or have functions of the print server 101.

The case where the two network printers 105 and 106 are provided for the print managing system is illustrated as an example in FIG. 1. However, the number of network printers is not limited to 2 but may be an arbitrary number of one or more.

As network printers 105 and 106, for example, printing apparatuses such as laser beam printer, ink jet printer, digital multifunction printer, and the like for printing by various systems can also be applied.

The network 107 is used to connect the client computers 102 to 104, print server 101, network printers 105 and 106, and the like so that they can mutually communicate. The network 107 is realized by using, for example, the Internet, LAN (Local Area Network), or the like.

Figure 2:
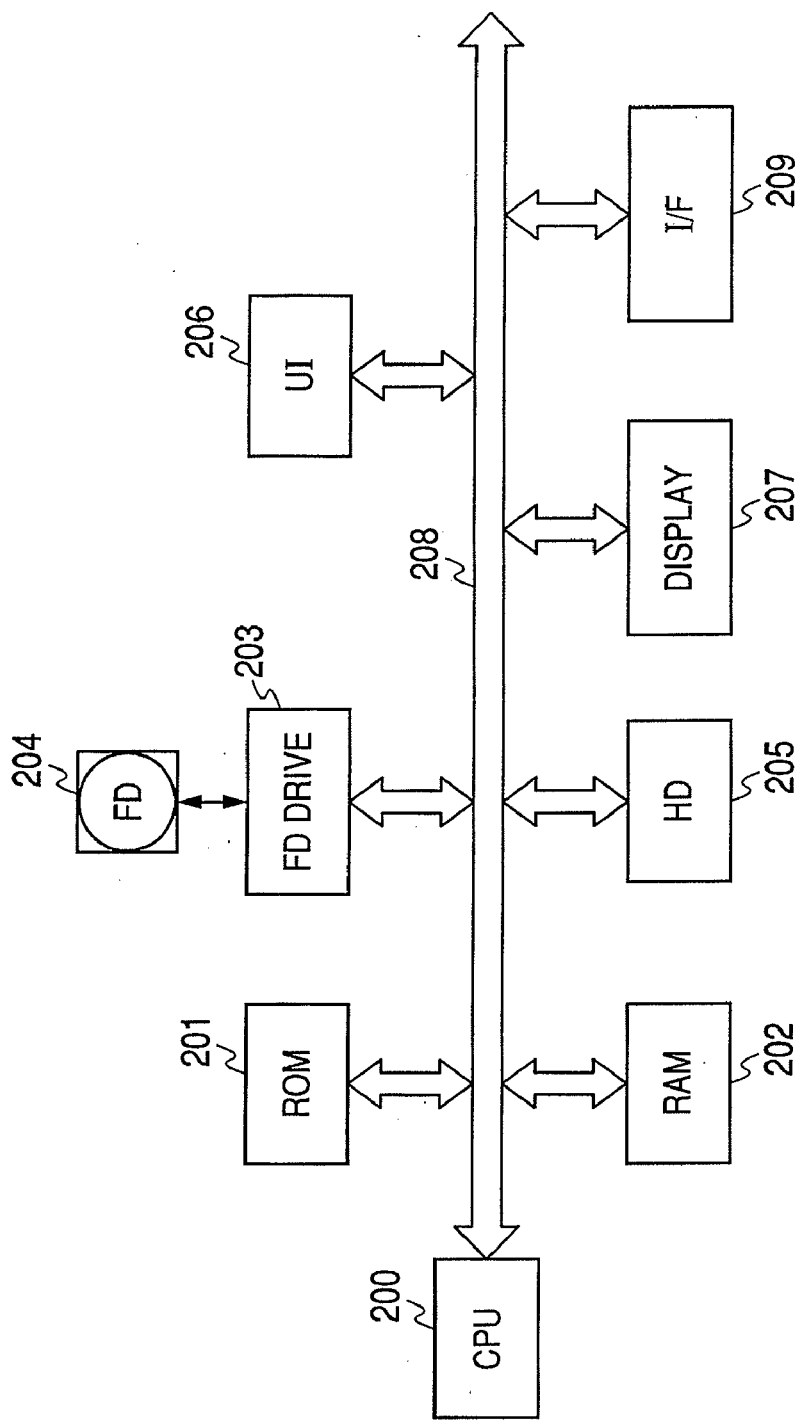
FIG. 2 illustrates an embodiment of the invention and is a block diagram illustrating an example of a construction of hardware in information processing apparatuses which can be used as client computers and a print server.

FIG. 2 is a block diagram illustrating an example of a construction of hardware in information processing apparatuses which can be used as client computers 102 to 104 and print server 101.

The client computers 102 to 104 and print server 101 can be realized by the information processing apparatuses having a similar hardware construction.

In FIG. 2, a CPU 200 is a control unit of the information processing apparatuses. The CPU 200 executes programs stored in a hard disk (HD) 205 or the like. As programs which are executed by the CPU 200, for example, there are an application program, a printer driver program, an Operating System (OS), a network printer control program, and the like. While the program is being executed, the CPU 200 controls so as to temporarily store information, files, and the like which are necessary for the execution of the program into a Random Access Memory (RAM) 202.

A Read Only Memory (ROM) 201 is a storing medium in which programs such as a basic I/O program and the like and various kinds of data such as font data, template data, and the like which are used when a document process is executed have been stored. The RAM 202 is a storing medium for temporarily storing data and functions as a main memory, a work area, or the like of the CPU 200.

A floppy disk (FD) drive 203 is used to load programs or the like stored in a floppy disk (FD) 204 as a storing medium into the information processing apparatus. The storing medium is not limited to FDs. An arbitrary storing medium such as CD-ROM, CD-R, CD-RW, PC card, DVD, IC memory card, MO, memory stick, or the like can be used in place of the FD.

The hard disk (HD) 205 is an external storing device and functions as a large capacity memory. The application program, printer driver program, OS, network printer control program, their related programs, and the like have been stored in the HD 205. A spooler is stored in the HD 205. The spooler denotes client spoolers in the client computers 102 to 104 and indicates a server spooler in the print server 101. In the print server 101, information of the print jobs received from the client computers 102 to 104 and a table adapted to control the printing order are also stored in the HD 205.

A User Interface (UI) 206 is a user interface for the user to input instructions. Specifically speaking, the UI 206 has a keyboard and a mouse. By using the keyboard and the mouse equipped for the UI 206, the user instructs the information processing apparatuses (client computers 102 to 104, print server 101) to input control commands and the like to the network printers 105 and 106.

A display 207 displays the control commands input from the UI 206, statuses of the network printers 105 and 106, and the like. The display 207 can be realized by using, for example, a Liquid Crystal Display (LCD). A system bus 208 is a transmission path of data in the information processing apparatuses (client computers 102 to 104, print server 101). An interface (I/F) 209 is used to connect the information processing apparatuses (client computers 102 to 104, print server 101) to the network 107. The information processing apparatuses (client computers 102 to 104, print server 101) can transmit and receive data to/from an external apparatus through the interface 209.

FIG. 3 is a diagram illustrating an example of a memory map in the RAM 202 shown in FIG. 2.

The network printer control program stored in the FD 204 is loaded into the RAM 202, so that it can be executed. The memory map in the state where such a program can be executed in this manner is illustrated in FIG. 3.

In FIG. 3, a basic I/O program 301 includes a program having an Initial Program Loading (IPL) function for developing the OS from the HD 205 into the RAM 202 and starting the operation of the OS when a power source of the information processing apparatus is turned on, and the like. An OS 302, a network printer control program 303, and related data 304 are stored into areas held in the RAM 202, respectively. A work area 305 is used when the CPU 200 executes the network printer control program 303 or the like.

In this embodiment, an example in which the network printer control program and the related data are directly loaded into the RAM 202 from the FD 204 and executed is shown. However, it is not always necessary to use such a method. For example, the network printer control program can be also loaded into the RAM 202 from the HD 205 in which the network printer control program has already been installed.

The storing medium for storing the network printer control program 303 is not limited to the FD 204 but may be a CD-ROM, a CD-R, a PC card, a DVD, an IC memory card, or the like. Further, by constructing in such a manner that the network printer control program 303 is stored into the ROM 201 and used as a part of the memory map, the network printer control program 303 can be also directly executed by the CPU 200.

Software for realizing functions which are equivalent to the foregoing apparatuses can be also constructed as alternatives of the hardware apparatuses.

In the following description, the network printer control program 303 is referred to as a print control program 303. The print control program 303 includes a program for controlling the client computers 102 to 104 so as to instruct a change in print destination of the print job or instruct a change in printing order. The print control program 303 also includes a program for allowing the print server 101 to control the order of the print jobs or notify the system of a print end of the print job, a print destination change request, or the like.

The print control program 303 for making such control in this embodiment can be divided into a module which is installed into the client computers 102 to 104 and a module which is installed into the print server 101. One print control program 303 can also function as a program for the client or the print server according to an environment where such a program is executed. Further, it is also possible to construct in such a manner that both the module having the function for the client and the module having the function for the print server are installed as a print control program 303 into one information processing apparatus and they are simultaneously or time-divisionally and falsely made operative in parallel. The embodiment described here has a construction such that the same print control program 303 is loaded into the client computers 102 to 104 and the print server 101.

FIG. 4 is a diagram illustrating an example of the memory map in the FD 204 shown in FIG. 2.

In FIG. 4, volume information 401 showing information of the data, directory information 402, a print control program (network printer control program) 403 which is developed in the RAM 202 as shown in FIG. 3, and related data 404 of the print control program 403 have been stored in the FD 204. The print control program 403 is obtained by programming processes based on flowcharts and time charts, which will be described later. The print control program 403 stored in the FD 204 is loaded as a print control program 303 into the RAM 202 as illustrated in FIG. 3. As mentioned above, in the embodiment, the client computers 102 to 104 and the print server 101 have a construction in which the same print control program 403 is loaded in the RAM 202.

Figure 5:
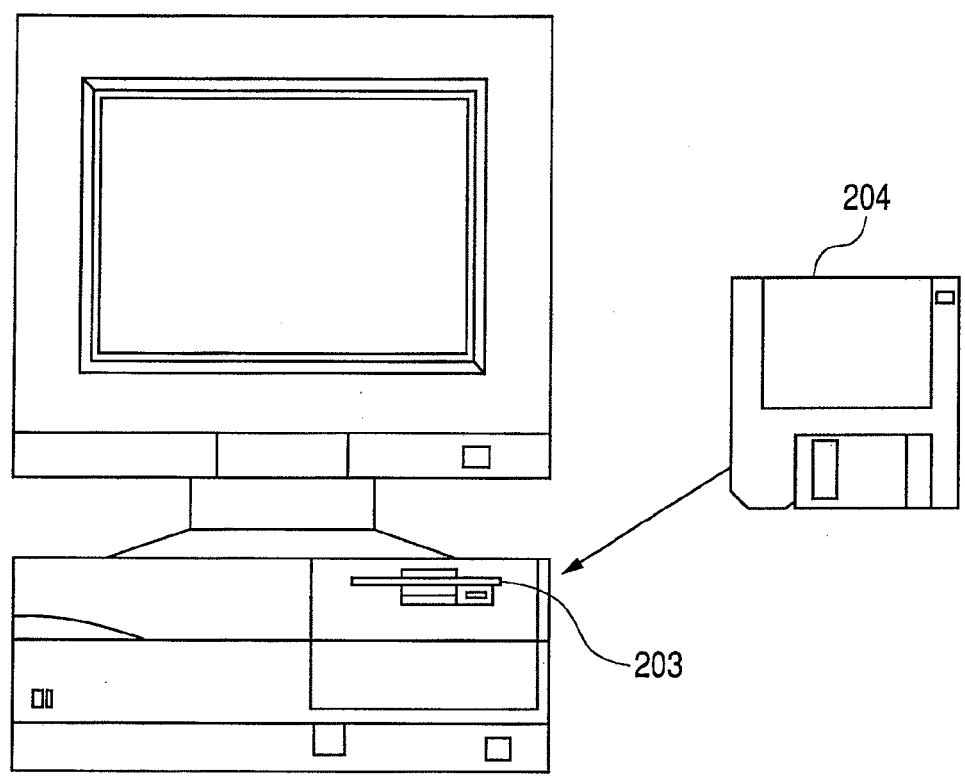
FIG. 5 illustrates an example of a relation between an FD drive and an FD which is inserted into the FD drive.

FIG. 5 is a diagram illustrating an example of a relation between the FD drive 203 and the FD 204 which is inserted into the FD drive 203. In FIG. 5, the print control program 403 obtained by programming the processes based on the flowcharts and the time charts, which will be described later, the related data 404, and the like has been stored in the FD 204.

Figure 6:
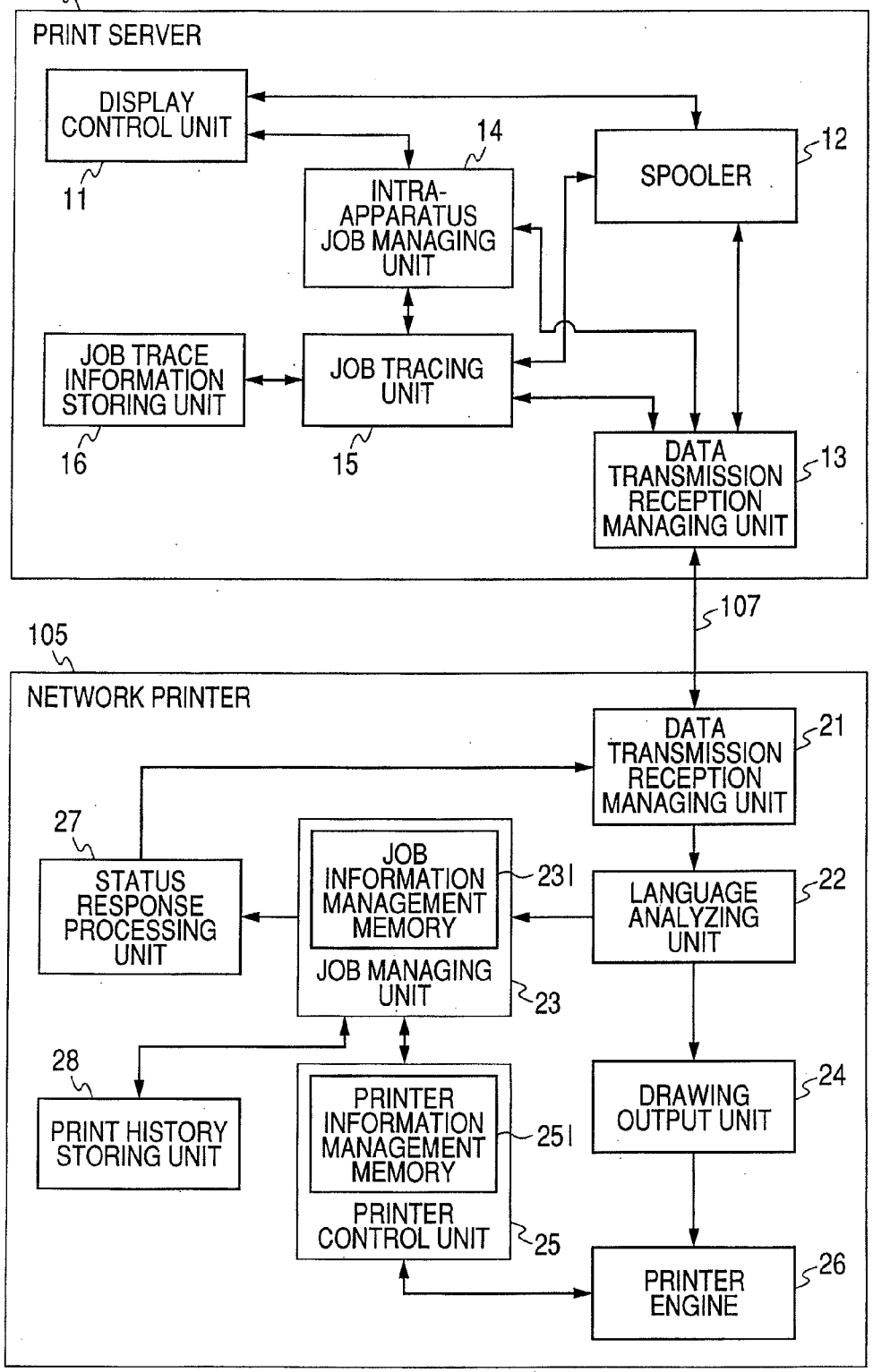
FIG. 6 illustrates an embodiment of the invention and is a block diagram illustrating an example of a functional construction of the print server and a network printer.

FIG. 6 is a block diagram illustrating an example of a functional construction of the print server 101 and the network printer 105. A part or all of a display control unit 11, a spooler 12, a data transmission reception managing unit 13, an intra-apparatus job managing unit 14, a job tracing unit 15, and a job trace information storing unit 16 shown in the print server 101 correspond to the functions which are realized by the print control program 303 described in FIG. 2. In this embodiment, a print control unit is realized by, for example, the print control program 303. The case where the print server 101 operates as a host computer (also referred to as a client computer) will be described as an example. The network printer 106 may be used in place of the network printer 105.

The display control unit 11 provided in the print server 101 allows the display 207 as an example of the display unit to display a list of print jobs held in the spooler 12 and a list of print jobs held in the network printer 105. The list of print jobs has been stored in either a non-volatile memory or a volatile memory provided for the network printer 105. The display control unit 11 has a function as a Graphic User Interface (GUI) for instructing the execution of the print job. As mentioned above, in this embodiment, a display control unit is realized by using, for example, the display control unit 11.

The spooler 12 receives external programs or print jobs (not shown). The spooler 12 sequentially transmits the received external programs or print jobs to the network printer 105 through the data transmission reception managing unit 13. The spooler 12 has a function of allocating an ID for tracing the job (hereinbelow, referred to as a "job tracing ID"), as an example of identification information for tracing the job, issued by the job tracing unit 15 to a job ticket 91 illustrated in FIG. 9 when the print job is transmitted to the network printer 105. As mentioned above, the execution instruction of the print job is performed based on a result of the operation of the user to the GUI displayed by the display control unit 11.

The data transmission reception managing unit 13 has a function for transmitting and receiving the transmission data to the network printer 105 and the reception data from the network printer 105 through the network 107.

The intra-apparatus job managing unit 14 has a function for obtaining the print jobs in the network printer 105, caching them, and supplying them to the display control unit 11. The intra-apparatus job managing unit 14 also has a function for receiving an instruction based on the operation result of the user to the GUI displayed by the display control unit 11 and transmitting a control command such as cancellation, stop, or the like of the print job to the network printer 105 through the data transmission reception managing unit 13.

The job tracing unit 15 traces a processing situation of the print job executed (printed) by the network printer 105 or the print job cached by the intra-apparatus job managing unit 14 from the spooler 12. The job tracing unit 15 will be described in detail hereinafter with reference to FIG. 7.

The job trace information storing unit 16 stores information regarding the print job which is being traced by the job tracing unit 15. In the embodiment, the job trace information storing unit 16 is constructed by using a non-volatile memory. Therefore, even if the print control program 303 is activated again, the job tracing unit 15 can trace the print job after reactivation by using the information regarding the print job which has been obtained before the reactivation.

A data transmission reception managing unit 21 provided for the network printer 105 has a function for transmitting the transmission data to the network printer 105 and receiving the reception data from the network printer 105 through the network 107. The data transmission reception managing unit 21 receives, for example, data of the print job and attributes of the print job from the print server 101 and manages them.

A language analyzing unit 22 analyzes contents of the data of the print job and the command in detail, decodes a print command, and executes a control command regarding the management of the print job, a drawing output, and the like according to the print command. Specifically speaking, for example, the language analyzing unit 22 receives control command groups one by one in order from a reception buffer in the data transmission reception managing unit 21, examines their contents according to a describing rule of a printer control language, and discriminates which type of process the control command requests. If it is determined as a discrimination result that the control command is a command regarding the print job or a command regarding the attributes of the print job, the language analyzing unit 22 issues a management command of the relevant print job to a job managing unit 23. The command regarding the print job is, for example, a start declaration, an end declaration, or the like of the print job. The command regarding the attributes of the print job is, for example, a sheet size, the number of sheets, staple, or the like.

Further, if the control command is a command to instruct the drawing output of characters, a figure, an image, or the like, the language analyzing unit 22 issues a drawing output command based on the relevant print job to a drawing output unit 24.

In response to the management command of the print job from the language analyzing unit 22, the job managing unit 23 manages the attributes of the print job sent from the print server 101 based on a schedule formed on a print job unit basis.

The job managing unit 23 has a job information management memory 231 constructed by using a volatile memory. A job management table, which will be described hereinafter, has been stored in the job information management memory 231. By using the job management table, the job managing unit 23 makes control on a job unit basis. Information registered in the job management table is initialized and formed by a start command of the print job and specified by an end command of the print job.

Irrespective of a discrimination result about whether or not the end command of the print job has been received, the job managing unit 23 can change the information registered in the job management table based on the data of the subsequent print job on instruction from the print server 101. Specifically speaking, the job managing unit 23 can execute a change in attributes of the print job, a change in priority of a schedule (printing order), a cancellation of the printing (deletion of the data of the print job), or the like.

According to the attributes of the print job to be executed, the job managing unit 23 issues a selection command (printer control command) of sheets which are used and a sheet discharging bin to a printer control unit 25. Further, by obtaining a state of the network printer 105 through the printer control unit 25, the job managing unit 23 always monitors a state of the print job which is being executed. When a predetermined condition such as timing or the like is satisfied when an error has occurred, the job managing unit 23 issues a status response request instruction to a status response processing unit 27.

A process of the job managing unit 23 will be described hereinafter.

The drawing output unit 24 has a function for drawing, developing, and outputting the characters, figure, image, or the like to print output. For example, in response to a drawing output command from the language analyzing unit 22, the drawing output unit 24 forms a relevant character pattern, executes a process such as calculation of the figure, development of the image data, or the like, develops the print data into a data format suitable to output, and thereafter, sends the print data to a printer engine 26.

According to the print data (output development data) converted into the data format suitable for output by the drawing output unit 24, the printer engine 26 actually forms an image onto a paper surface by using, for example, a mechanism such as an electrophotographic system or the like and executes a print outputting process.

The printer engine 26 has a residual amount detecting unit of recording sheets. When no sheets are set in the printer, the printer engine 26 always sends a warning signal to the printer control unit 25. If there are no sheets when the developing and printing processes are executed, the printer engine 26 stops a recording unit such as a printer drum or the like and transmits an error signal to the printer control unit 25 by an interrupting unit or the like.

The printer control unit 25 has a function for controlling the network printer 105 by executing, for example, a selection of the sheets to be used, an initialization of the network printer 105, and the like according to the printer control command from the job managing unit 23. The printer control unit 25 always monitors the states of the whole network printer 105 such as state of a sheet cassette, door-open, the absence of toner, and the like. The printer control unit 25 also has a function for notifying another component of the state of the network printer 105 as necessary.

The latest state of the network printer 105 such as sheet residual amount, error state, etc. has been stored in a printer information management memory 251 provided in the printer control unit 25.

According to the status response request instruction received from the job managing unit 23, the status response processing unit 27 converts a status notification expressed by an internal format of the network printer 105 into an external expression which can be interpreted by the print server 101 and forms status response information. The statuses which are received from the job managing unit 23 include: a status in which the job managing unit 23 itself is managed in the job management table that is developed in the volatile memory; and a status in which the job managing unit 23 itself is managed in the non-volatile memory by a print history storing unit 28. The status response processing unit 27 transfers the status response information to the data transmission reception managing unit 21.

When the status response information is received from the status response processing unit 27, the data transmission reception managing unit 21 temporarily stores the status response information into a transmission buffer or the like and returns the stored status response information to the print server 101 through the network 107.

The print history storing unit 28 manages the status as a print processing result to form a response illustrated in FIG. 18B, which will be described hereinafter, in the non-volatile memory such as a hard disk. When the print server 101 cannot obtain the state of the job from the job management table developed in the volatile memory, a job history as a processing result of the print job is transmitted from the print history storing unit 28 to the print server 101.

Figure 7:
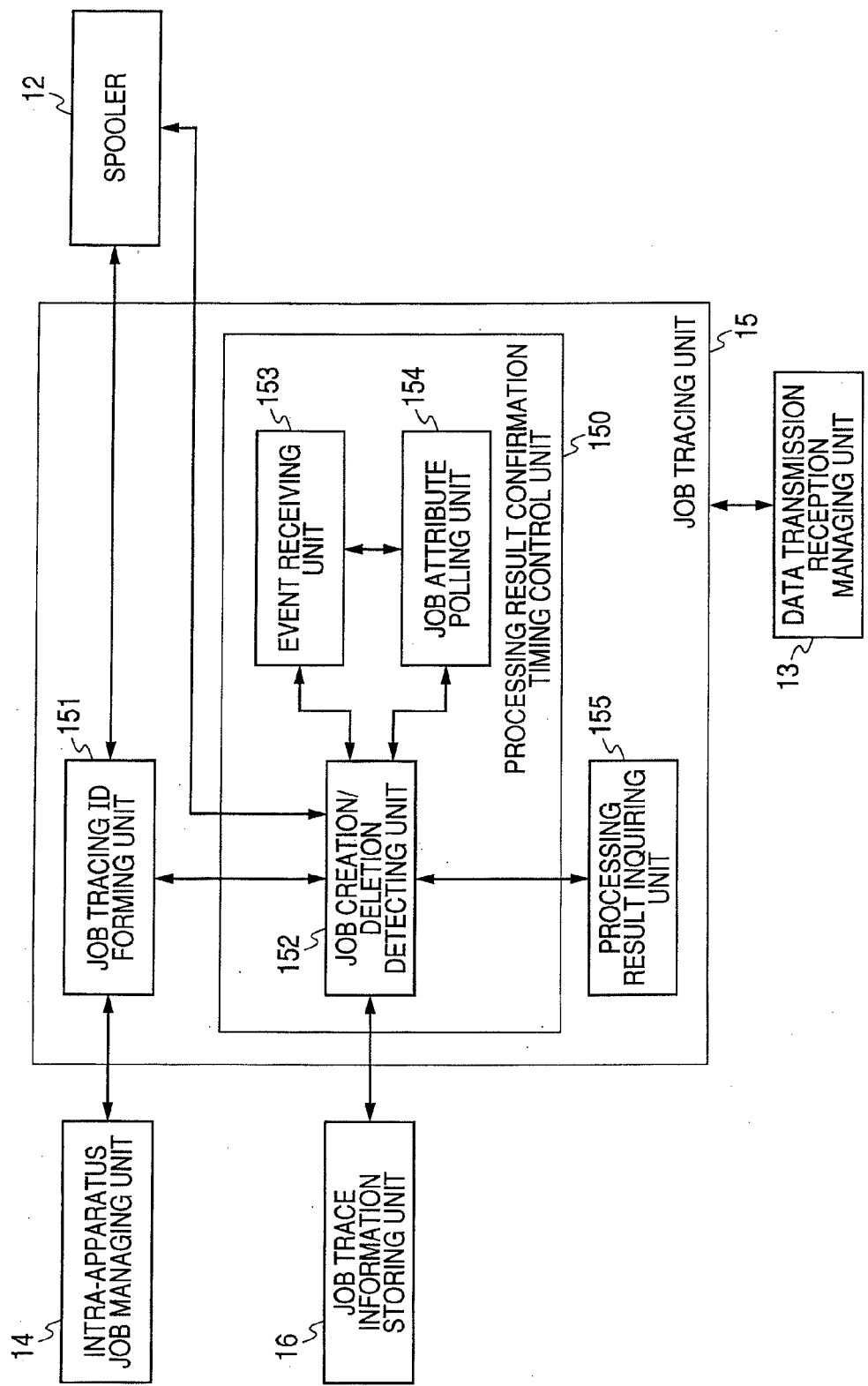
FIG. 7 illustrates an embodiment of the invention and is a block diagram illustrating an example of a detailed construction of a job tracing unit.

FIG. 7 is a block diagram illustrating an example of a detailed construction of the job tracing unit 15.

In FIG. 7, when the print job is transmitted from the spooler 12 or when the printing of the print job cached by the intra-apparatus job managing unit 14 is executed, a job tracing ID forming unit 151 forms a unique ID for tracing the state of the print job. In the following description, such an ID is called a job tracing ID. In the embodiment, a Universally Unique Identifier (UUID) is used as an example of the job tracing ID.

A job creation/deletion detecting unit 152 manages the job tracing ID received from the job tracing ID forming unit 151 by using a job trace information table stored in the job trace information storing unit 16. The job creation/deletion detecting unit 152 receives information from an event receiving unit 153, a job attribute polling unit 154, and the spooler 12. Thus, based on those information, the job creation/deletion detecting unit 152 monitors whether or not the print job having the job tracing ID formed in the job tracing ID forming unit 151 has been formed in the network printer 105 and whether or not the printing process is finished and the print job has been deleted.

The event receiving unit 153 receives event information from the network printer 105 through the data transmission reception managing unit 13. The event receiving unit 153 also receives event information occurring in the print server 101. The event information includes, for example, a job state change event showing that the state of the print job has been changed, a timer event showing the activation of a timer, and the like. Completion of the print job is also included in the state of the print job.

The job attribute polling unit 154 obtains the information (for example, attributes) of the print job by executing a polling process.

In the embodiment, a processing result confirmation timing control unit 150 to control timing for confirming the processing result in the network printer 105 is constructed by using the job creation/deletion detecting unit 152, event receiving unit 153, and job attribute polling unit 154. A normal end, an abnormal end, a cancellation end, and the like of the print job are included in the processing result here.

A processing result inquiring unit 155 has such a function that if it is detected that the print job as a confirmation target has been deleted by the job creation/deletion detecting unit 152, the processing result of the print job is inquired by using a command, which will be described hereinafter.

A detailed processing flowchart of the job tracing unit 15 will be described hereinafter with reference to FIG. 15.

Figures 8, 9:
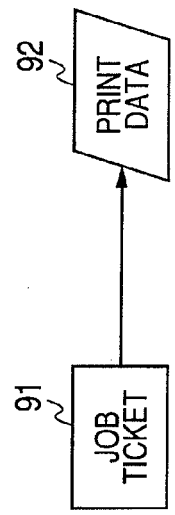
FIG. 8 illustrates an embodiment of the invention and is a diagram illustrating an example of a state of a job trace information table at a certain time point.
FIG. 9 illustrates an embodiment of the invention and is a diagram illustrating an example of data of a print job.

FIG. 8 is a diagram illustrating an example of the state of the job trace information table at a certain time point. As mentioned above, the job trace information table has been stored in the job trace information storing unit 16.

In the job trace information table illustrated in FIG. 8, various kinds of information are managed in a table format by using a unique job ID 81. The job ID 81 is an identifier for unconditionally specifying each record in the job trace information table. In the embodiment, a job tracing ID 82 can be also substituted for the job ID 81. More specifically speaking, the job tracing ID 82, an ID (intra-apparatus job ID) 83 of the print job in the network printer 105, a processing state (state of the job) 84 of the print job in the network printer 105, and attributes (job attributes) 85 of the print job are managed. In the example illustrated in FIG. 8, two print jobs are being traced. Between the two print jobs, since the print job whose job ID 81 is equal to "2" is not formed in the network printer 105, the intra-apparatus job ID 83 and the state of the job 84 are blank. The contents in the job trace information table are changed by the process (job creation/deletion detecting unit 152) according to the network printer control program 403. By using the job tracing ID 82 in FIG. 8 as a key, to which print job the job state change event illustrated in FIG. 16 and the responses from the network printer 105 illustrated in FIGS. 17B and 18B correspond is specified.

FIG. 9 is a diagram illustrating an example of the data of the print job which is used in the print managing system of the embodiment.

In FIG. 9, the data of the print job has: the job ticket 91 which holds print settings; and print data 92 such as PDF, PS, or the like. A location of the print data is referred to from the contents of the job ticket 91. It can be assumed that the job ticket 91 is based on, for example, a Job Definition Format (JDF).

FIG. 10 is a diagram illustrating an example of the job ticket 91.

Besides print attributes 1005 such as the number of copies, sheet size, job name, and the like, a job ID 1001 for the network printer control program 403 to identify and manage the print job and a job tracing ID 1002 as mentioned above are included in the job ticket 91 illustrated in FIG. 10.

There is a case where the total number of pages as a kind of print attribute 1005 is not decided until the print data 92 is developed. There can be a case where the total number of pages is unknown. Further, in the job ticket 91 in the embodiment, an exceptional setting can be made by specifying a page range. In the example illustrated in FIG. 10, a sheet type "thick paper" has been set for the first and second pages and "thick paper" has also been set for the 23rd and 24th pages. In the exceptional setting pages, the exceptional setting "thick paper" is used in place of a sheet type "plain paper" which is set for all print jobs. A plurality of types of print attributes can also be set as targets of the exceptional setting and the print attributes which have exceptionally been set are used with respect to each type. It is assumed that print attributes 1005*a* in all of the print jobs are used as print attributes of the pages which are not exceptionally set.

FIG. 11 is a diagram illustrating an example of a job management table stored in the job information management memory 231 illustrated in FIG. 6. The case where the print jobs stored in the job trace information table illustrated in FIG. 8 exist is shown as an example in FIG. 11.

In FIG. 11, in the job management table, together with information such as state 1104 of the job and reception number 1101, information (a job tracing ID 1102, an intra-apparatus job ID 1103, and job attributes 1105) extracted from the foregoing job ticket 91 is managed.

Figure 12:
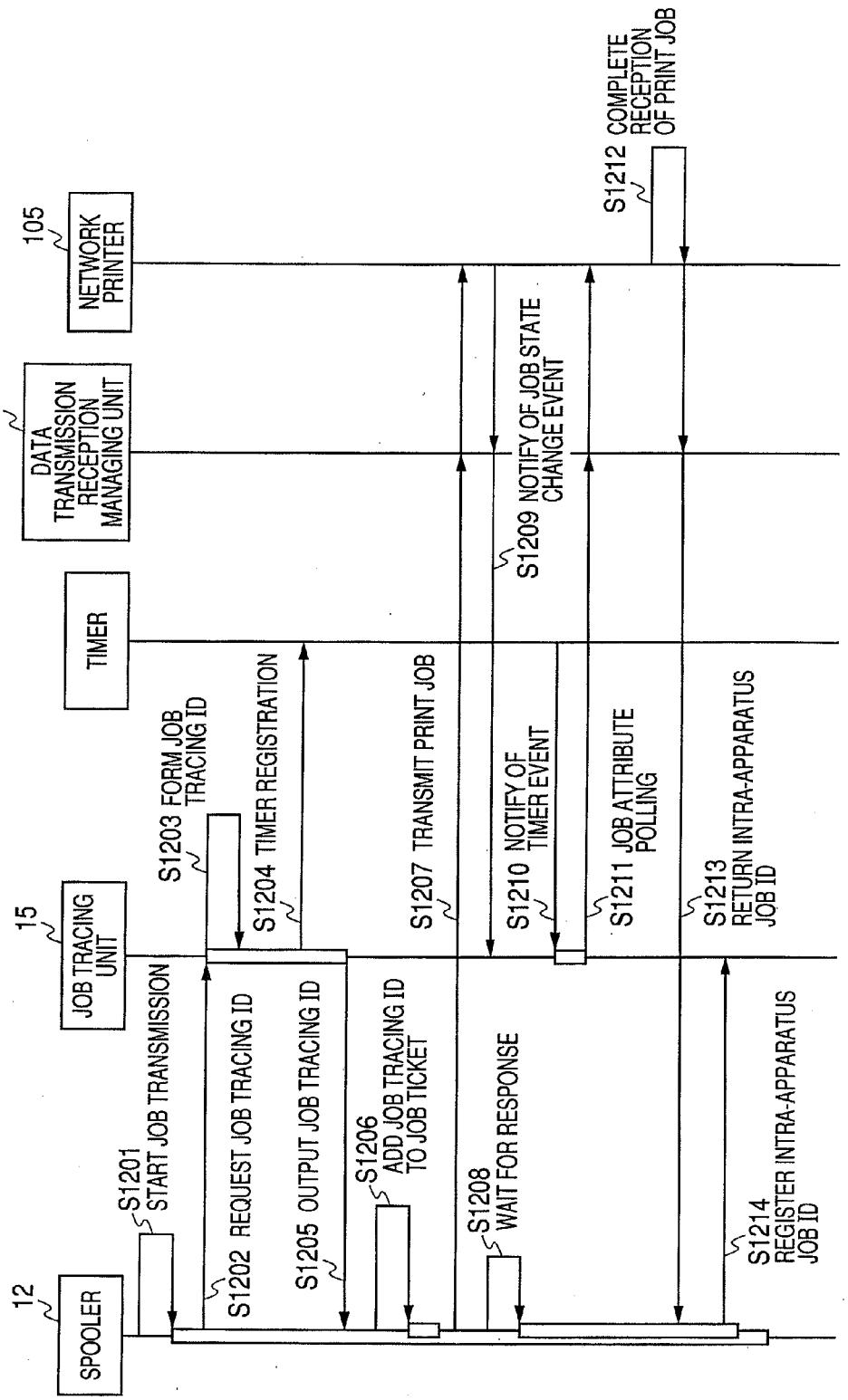
FIG. 12 illustrates an embodiment of the invention and is a sequence diagram illustrating an example of a processing procedure in the print managing system when the print job is transmitted from the print server to the network printer.

FIG. 11 indicates a state just after a print job having the intra-apparatus job ID "0x11181" was received according to a processing procedure illustrated in FIG. 12. The reception number 1101 is used to unconditionally arrange each record in the job information management memory 231 on the printer side. In the embodiment, the intra-apparatus job ID may be substituted for the reception number 1101.

FIG. 12 is a sequence diagram illustrating an example of the processing procedure in the print managing system at the time of transmitting the print job from the print server 101 to the network printer 105 by the processes of the print control program 303 loaded into the print server 101. That is, FIG. 12 corresponds to the processes of the print managing system in the case of transmitting the print job in the spooler 12 to the network printer 105.

First, in step S1201, the spooler 12 starts a transmitting process of the print job. Thus, in S1202, the spooler 12 requests the job tracing unit 15 to form a job tracing ID.

Subsequently, in S1203, the job tracing unit 15 forms the job tracing ID (UUID).

In next S1204, the job tracing unit 15 generates a timer event (registers (sets) a predetermined value into a timer provided for the print server 101) in order to start a tracing process of the print job.

Subsequently, in S1205, the job tracing unit 15 outputs the job tracing ID formed in S1204 to the spooler 12. The tracing process of the print job in the job tracing unit 15 will be described in detail with reference to FIG. 15.

When the job tracing ID is received, the spooler 12 sets (allocates) the received job tracing ID as a job tracing ID 1002 of the job ticket 91 mentioned above. Then, in S1207, the spooler 12 transmits the print job including the job ticket 91 in which the job tracing ID has been set in S1206 and the print data 92 to the network printer 105. In S1208, the spooler 12 waits until there is a response from the network printer 105.

Subsequently, when the print job is received, in S1209, the network printer 105 forms a print job and notifies the job tracing unit 15 of a job state change event showing that the state of the print job has been changed. The event receiving unit 153 illustrated in FIG. 7 receives the job state change event and outputs to the job creation/deletion detecting unit 152. The job creation/deletion detecting unit 152 updates the job trace information table illustrated in FIG. 8 based on the job state change event output from the event receiving unit 153. By receiving the job state change event, the job creation/deletion detecting unit 152 detects that the print job has been formed. A normal end, an abnormal end, a cancellation end, and the like of the printing are also included in the state change of the print job. The network printer 105 notifies the job tracing unit 15 of the state change of the print job at timing subsequent to S1213.

Subsequently, in S1210, when the timer provided for the print server 101 has timed up, the event receiving unit 153 in the job tracing unit 15 receives a notification of the timer event. In S1211, the job attribute polling unit 154 executes a polling process of the print job to the network printer 105 as a transmission destination of the print job transmitted from the spooler 12 in S1207. By applying the polling, the job attribute polling unit 154 obtains the information of the print job (for example, attributes and the state of the print job) to which the job tracing ID set in S1206 has been allocated from the network printer 105. The job creation/deletion detecting unit 152 updates the job trace information table illustrated in FIG. 8 based on the information of the print job obtained by the job attribute polling unit 154. It is also assumed that the normal end, abnormal end, cancellation end, and the like of the printing are also included in the status included in the response to the polling in S1211.

Subsequently, in S1212, the network printer 105 waits until a receiving process of the print job is completed. When the receiving process of the print job is completed, in S1213, the network printer 105 transmits the ID of the job formed in the network printer 105 to the spooler 12. This ID is, for example, the intra-apparatus job ID "0x11181" shown in FIG. 11. Naturally, the print server 101 may obtain the intra-apparatus job ID from the network printer 105 immediately after the transmission of the print job which is executed in S1207. However, in this embodiment, in order to certainly monitor the completion of the process of the print job (for example, completion of the printing) in the network printer 105, in S1213, the intra-apparatus job ID is obtained on the spooler 12 side on completion of the process of the print job by the network printer 105.

When the intra-apparatus job ID is received, the spooler 12 outputs the intra-apparatus job ID to the job creation/deletion detecting unit 152 in S1214. The job creation/deletion detecting unit 152 registers the intra-apparatus job ID output from the spooler 12 into the job trace information table illustrated in FIG. 8. The job creation/deletion detecting unit 152 sets, for example, the intra-apparatus job ID "0x11181" as an intra-apparatus job ID 83 whose job ID shown in FIG. 8 is equal to "2".

The job tracing process which is executed by the job tracing unit 15 in S1209, S1211, and S1214 will be described in detail hereinafter with reference to FIG. 15. The receiving process of the print job which is executed by the network printer 105 at timing between S1207 and S1213 will be described in detail hereinafter with reference to FIG. 13.

Figure 13:
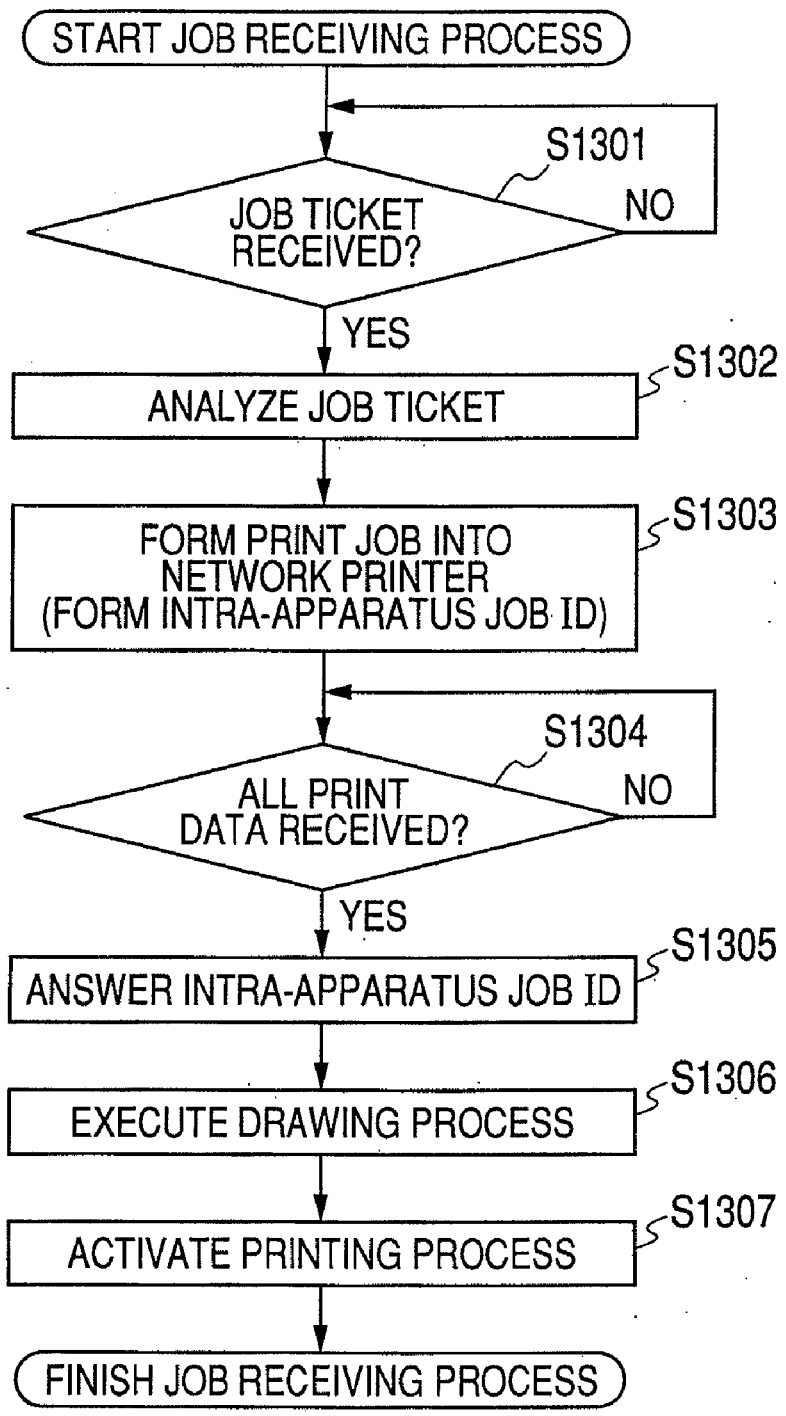
FIG. 13 illustrates an embodiment of the invention and is a flowchart for describing an example of a receiving process of the print job in the network printer.

FIG. 13 is a flowchart for describing an example of the receiving process of the print job in the network printer 105.

In S1301, the data transmission reception managing unit 21 waits until the job ticket 91 is received. When the job ticket 91 is received, the processing routine advances to S1302. In S1302, the language analyzing unit 22 analyzes the job ticket 91 received in S1301.

Subsequently, in S1303, the job managing unit 23 forms a new print job into the job information management memory 231. For example, the job managing unit 23 forms the print job whose intra-apparatus job ID shown in FIG. 11 is equal to "0x11181". In this manner, the intra-apparatus job ID is formed in S1303.

When the print job is formed in the network printer 105 as mentioned above, the status response processing unit 27 forms the job state change event showing that the state of the print job has been changed. The data transmission reception managing unit 21 transmits the job state change event formed in the status response processing unit 27 to the spooler 12 as a transmitting source of the job ticket 91 received in S1301.

Subsequently, in S1304, the data transmission reception managing unit 21 waits until all of the print data 92 is received. When all of the print data 92 is received, S1305 follows. In S1305, the data transmission reception managing unit 21 transmits the intra-apparatus job ID (for example, "0x11181") formed in S1303 to the spooler 12. The process of S1304 and S1305 is a process corresponding to S1213 shown in FIG. 12.

Subsequently, in S1306, the drawing output unit 24 executes a drawing process based on the job ticket 91 received in S1301 and the print data 92 received in S1304. In S1307, the printer engine 26 executes a printing process to form an image onto the paper surface based on a result of the drawing process executed in S1306. The drawing process of S1306 and the printing process of S1307 are queued, respectively, and enter a waiting state when a preceding print job exists.

Figure 14:
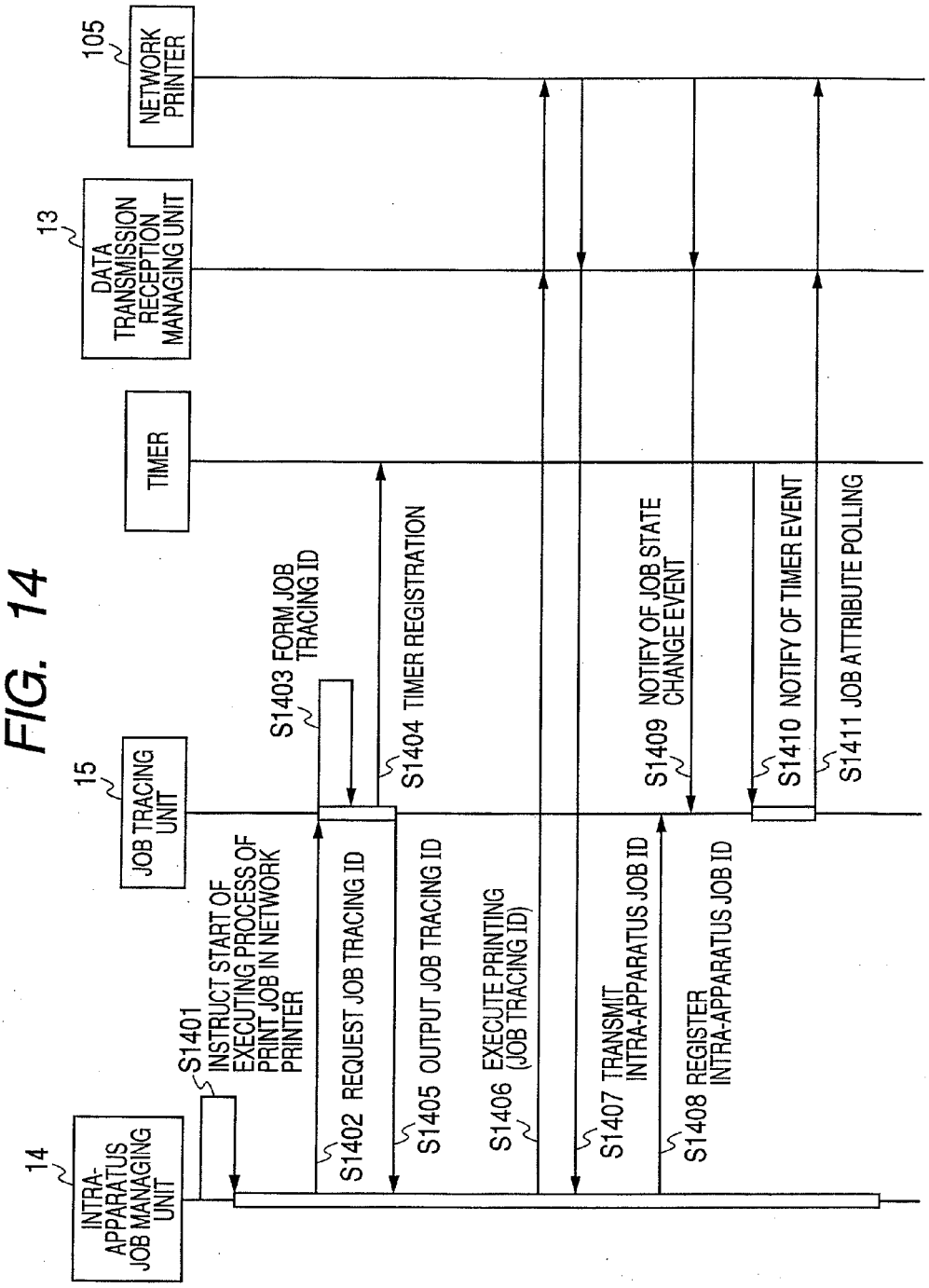
FIG. 14 illustrates an embodiment of the invention and is a sequence diagram illustrating an example of a processing procedure in the print managing system at the time of executing the print jobs stored in the network printer.

FIG. 14 is a sequence diagram illustrating an example of a processing procedure in the print managing system at the time of executing the print jobs stored in the hard disk or the like of the network printer 105 based on the processes of the print control program 303 loaded into the print server 101. A plurality of print jobs have been stored in the hard disk. The user can instruct a re-printing of any one of the stored print jobs at arbitrary timing from an operation panel or a remote computer (print server 101).

First, in S1401, the intra-apparatus job managing unit 14 instructs the start of execution (printing process) of the print job stored in the network printer 105. When the start of the print job is instructed, the display control unit 11 allows the print server 101 to display a list of print jobs stored in the non-volatile memory or the volatile memory in the network printer 105 by the print control program 303. The instruction to execute a user's desired print job in the displayed list of the print jobs is used as a trigger and the start of the print job is instructed.

As mentioned above, in this embodiment, in S1401, the CPU 200 of the print server 101 executes the print control program 303 in the FD 204 or the HD 205, so that the display control step is realized.

Subsequently, in S1402, the intra-apparatus job managing unit 14 requests the job tracing unit 15 to form a job tracing ID.

In the next step S1403, the job tracing unit 15 forms the job tracing ID (UUID). In this manner, in this embodiment, for example, a forming unit is realized by the job tracing unit 15. For example, in S1403, the CPU 200 of the print server 101 executes the print control program 303 in the FD 204 or the HD 205, so that the forming step is realized.

Then, in S1404, the job tracing unit 15 generates the timer event (registers (sets) the predetermined value into the timer provided for the print server 101) in order to start the tracing process of the print job.

Subsequently, in S1405, the job tracing unit 15 outputs the job tracing ID formed in S1403 to the intra-apparatus job managing unit 14. The tracing process of the print job in the job tracing unit 15 will be described in detail with reference to FIG. 15.

When the job tracing ID is received, the intra-apparatus job managing unit 14 instructs, in S1406, the network printer 105 to execute the printing by using the received job tracing ID. Specifically speaking, the intra-apparatus job managing unit 14 transmits the control command including the received job tracing ID to the network printer 105 through the data transmission reception managing unit 13, thereby instructing the network printer 105 to execute the printing. In this manner, in the embodiment, for example, a notifying unit is realized by using the data transmission reception managing unit 13 and the intra-apparatus job control. For example, in S1406, the CPU 200 of the print server 101 executes the print control program 303 in the FD 204 or the HD 205, so that the notifying step is realized.

Subsequently, when the intra-apparatus job ID is newly formed by executing the print job, the network printer 105 immediately transmits, in S1407, the intra-apparatus job ID to the intra-apparatus job managing unit 14.

When the intra-apparatus job ID is received from the network printer 105, the intra-apparatus job managing unit 14 outputs, in S1408, the intra-apparatus job ID to the job creation/deletion detecting unit 152. The job creation/deletion detecting unit 152 registers the intra-apparatus job ID output from the spooler 12 into the job trace information table illustrated in FIG. 8. The job tracing unit 15 executes the tracing process of the print job.

Subsequently, in S1409, when the print job is executed, the network printer 105 forms a new print job and notifies the job tracing unit 15 of the job state change event showing that the state of the print job has been changed. In a manner similar to the job state change event described in S1209, the normal end, abnormal end, cancellation end, and the like of the printing are also included in the job state change event which is notified to the job tracing unit 15 in S1409.

The event receiving unit 153 illustrated in FIG. 7 receives the job state change event and outputs to the job creation/deletion detecting unit 152. The job creation/deletion detecting unit 152 updates the job trace information table illustrated in FIG. 8 based on the job state change event output from the event receiving unit 153.

Subsequently, in S1410, when the timer provided for the print server 101 has timed up, the event receiving unit 153 in the job tracing unit 15 receives the notification of the timer event. In S1411, the job attribute polling unit 154 executes the polling process of the print job to the network printer 105 to which the execution of the printing has been instructed in S1406 and obtains the information of the print job (for example, the attributes and the state of the print job). The job creation/deletion detecting unit 152 updates the job trace information table illustrated in FIG. 8 based on the information of the print job obtained by the job attribute polling unit 154. It is also assumed that the normal end, abnormal end, cancellation end, and the like of the printing are also included in the status included in the response to the polling which is executed in S1411.

The job tracing process which is executed in the job tracing unit 15 will be described in detail with reference to FIG. 15.

Figure 15:
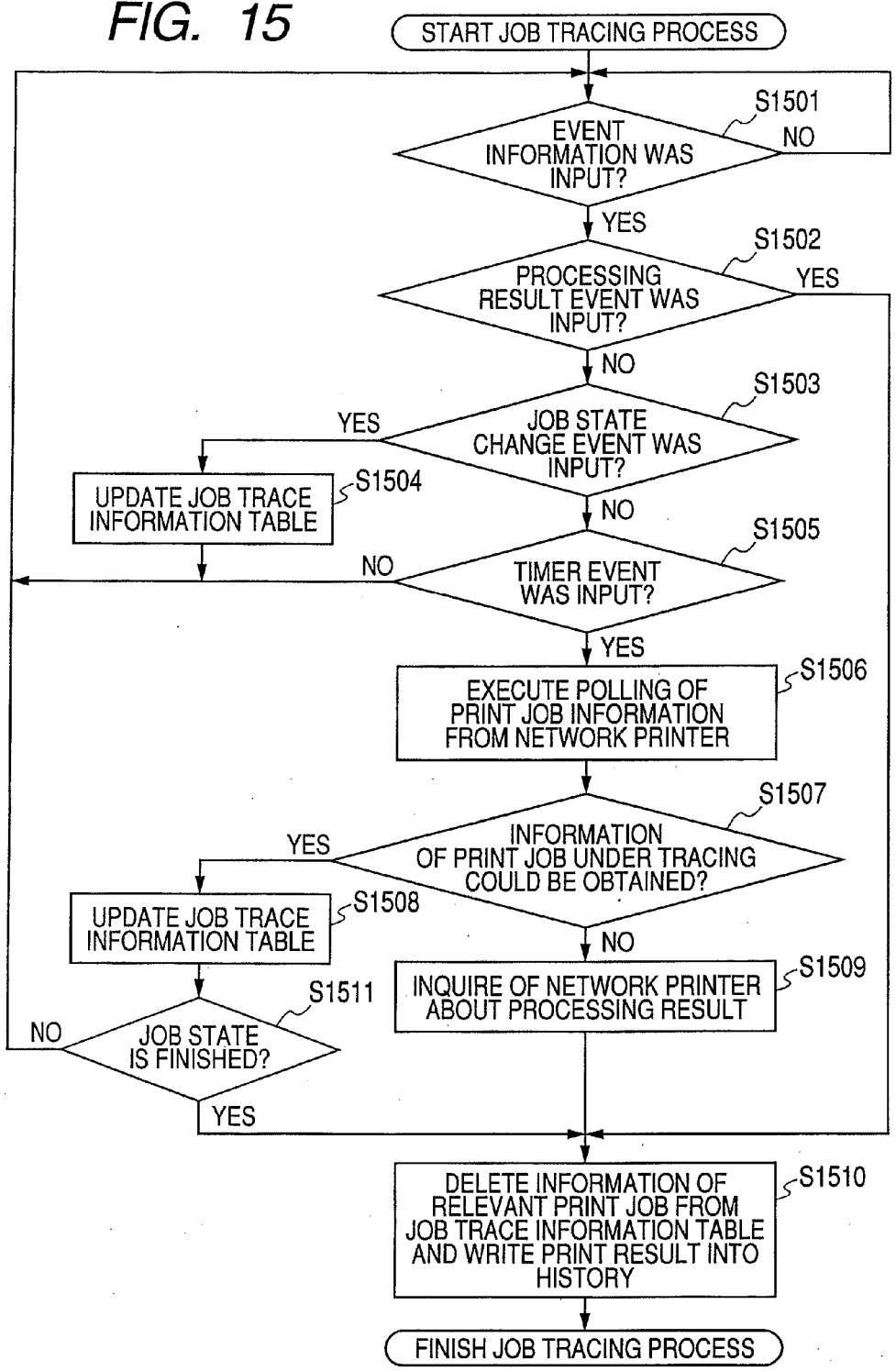
FIG. 15 illustrates an embodiment of the invention and is a flowchart for describing in detail an example of a job tracing process.

FIG. 15 is a flowchart for describing in detail an example of the job tracing process which is executed by the job tracing unit 15. Processes of the flowchart of FIG. 15 correspond to the processes which are executed as an ordinary print control process in response to the print instruction in one of S1201 in FIG. 12 and S1401 in FIG. 14 so long as an unexpected power-off or the like of the print server 101 does not occur.

First, in S1501, the event receiving unit 153 in the job tracing unit 15 waits until the event information is input. When the event information is input, S1502 follows.

In S1502, the event receiving unit 153 discriminates whether or not the input event information is a processing result event (for example, print completion event) for the print job which is being traced. As a result of the discrimination, if the input event information is the processing result event (state notification of the print job) for the print job which is being traced, processes of S1503 to S1509 are omitted and the processing routine advances to S1510, which will be described hereinafter. On the other hand, if the input event information is not the processing result event for the print job which is being traced, S1503 follows. In this manner, the state notification of the print job which is discriminated in S1502 is made by the event information which is notified from the network printer 105.

In S1503, the event receiving unit 153 discriminates whether or not the input event information is the job state change event showing that the state of the print job which is being traced has been changed. The process of S1503 is a process corresponding to S1209 in FIG. 12 or S1410 in FIG. 14. As a result of the discrimination, if the input event information is the job state change event showing that the state of the print job which is being traced has been changed, S1504 follows. In S1504, based on the job state change event which was input, the job creation/deletion detecting unit 152 updates the job trace information table stored in the job trace information storing unit 16. An example of the job state change event in the embodiment will be described hereinafter with reference to FIG. 16. Returning to S1501, the event receiving unit 153 waits until the event information is input.

If it is determined in S1503 that the input event information is not the job state change event showing that the state of the print job which is being traced has been changed, S1505 follows. In S1505, the event receiving unit 153 discriminates whether or not the input event information is the timer event. As a result of the discrimination, if the input event information is not the timer event, the processing routine is returned to S1501 and the event receiving unit 153 waits until the event information is input. If the input event information is the timer event, S1506 follows. In S1506, the job attribute polling unit 154 executes the polling process of the print job to the network printer 105 and obtains the information (for example, attributes) of the print job. The process of S1506 is a process corresponding to S1211 in FIG. 12 or S1411 in FIG. 14. An example of the command and response which are used in the job attribute polling process in the embodiment will be described hereinafter with reference to FIGS. 17A and 17B.

Subsequently, in S1507, the job creation/deletion detecting unit 152 collates the information of the print job (state notification of the print job) obtained in S1506 with the job trace information table in the job trace information storing unit 16 by using the job tracing ID 82 as a key. Based on a result of the collation, the job creation/deletion detecting unit 152 discriminates whether or not the information of the print job which is being traced could be obtained. In this manner, the state notification of the print job which is discriminated in S1507 is made by the response according to the polling to the network printer 105.

As a result of the discrimination, if the information of the print job which is being traced could be obtained, S1508 follows. In S1508, based on the information of the print job obtained in S1506, the job creation/deletion detecting unit 152 updates the job trace information table stored in the job trace information storing unit 16.

As mentioned above, in the embodiment, for example, a discriminating unit is realized by using the job creation/deletion detecting unit 152 and the event receiving unit 153 (job tracing unit 15). For example, in S1502 and S1507, the CPU 200 of the print server 101 executes the print control program 303 in the FD 204 or the HD 205, so that the discriminating step is realized.

Subsequently, in S1511, the job creation/deletion detecting unit 152 discriminates whether or not the state of the print job is the end of the print job (normal end, abnormal end, cancellation end, and the like of the print job). As a result of the discrimination, if the state of the print job is the end of the print job, the processing routine advances to S1510, which will be described hereinafter. If the state of the print job is not the end of the print job, the processing routine is returned to S1501 and the job creation/deletion detecting unit 152 waits until the event information is input.

If it is decided in S1507 that the information of the print job which is being traced could not be obtained, it is determined that the print job which is being traced has been deleted (extinguished), and S1509 follows. In S1509, the processing result inquiring unit 155 inquires a processing result of the print job from the network printer 105 which is processing the print job which is being traced. The network printer 105 in which the inquiry about the processing result in S1509 has been analyzed by the language analyzing unit 22 reads out response information from the print history storing unit 28 through the job managing unit 23. The network printer 105 transmits the read-out response information to the print server 101 through the status response processing unit 27 and responds to the inquiry about the processing result. An example of the command and response which are used in the inquiry about the processing result of the print job will be described hereinafter with reference to FIGS. 18A and 18B.

As mentioned above, in the embodiment, for example, a tracing unit is realized by using the processing result inquiring unit 155 (job tracing unit 15). For example, in S1509, the CPU 200 of the print server 101 executes the print control program 303 in the FD 204 or the HD 205, so that the tracing step is realized.

Subsequently, in S1510, the job creation/deletion detecting unit 152 deletes the information of the relevant print job from the job trace information table in the job trace information storing unit 16 and writes the processing result, the number of printed sheets, and the like into a print history file. The print history file has been stored in, for example, the non-volatile memory provided for the print server 101.

It is desirable that the processes of the flowchart illustrated in FIG. 15 mentioned above are automatically executed each time the print server 101 is activated.

FIG. 16 is a diagram illustrating an example of the information of the job state change event.

In FIG. 16, a packet type (Packet Type) 1601, a request ID (ReqID) 1602, an intra-apparatus job ID 1603, a job tracing ID 1604, and a state 1605 of the job are included in the job state change event. The job tracing ID 1604 corresponds to the job tracing ID 1002 in the job ticket 91 illustrated in FIG. 10 and the job tracing ID 82 in the job trace information table illustrated in FIG. 8. The job tracing unit 15 compares the job tracing ID 1604 included in the job state change event with the job tracing ID 82 in the job trace information table, thereby updating the information regarding the job tracing ID 82 which coincides with the job tracing ID 1604.

FIGS. 17A and 17B are diagrams illustrating an example of a command (job attribute polling command) which is used in the job attribute polling process and contents of a response to the job attribute polling command in the embodiment.

FIG. 17A is a diagram illustrating the example of the contents of the job attribute polling command. The case where a state of the print job (attribute 1708) and a job tracing ID (attribute 1709) are obtained as attributes of the print job from the two print jobs is illustrated as an example in FIG. 17A. A fact that the attributes of the print job are obtained from the two print jobs is determined because the number of obtained jobs 1704 is equal to "2". A packet type (Packet Type) 1701, a request ID (ReqID) 1702, and an operation code (OpCode) 1703 exist in the job attribute polling command.

The job attribute polling command is processed by the job managing unit 23 in the network printer 105.

FIG. 17B is a diagram illustrating the example of the contents of the response to the job attribute polling command illustrated in FIG. 17A. The job managing unit 23 extracts the necessary information from the job information management memory 231 by using intra-apparatus job IDs 1705 and 1706 and the attributes 1708 and 1709 of the obtained print jobs as keys, thereby forming the response to the job attribute polling command.

The job tracing unit 15 which received the response compares a job tracing ID 1709' included in the response with the job tracing ID 82 in the job trace information storing table stored in the job trace information storing unit 16. The job tracing unit 15 updates the information regarding the job tracing ID 82 which coincides with the job tracing ID 1709'.

FIGS. 18A and 18B are diagrams illustrating an example of a command (processing result inquiring command) which is used in the inquiry about the processing result of the print job and contents of the response to the processing result inquiring command.

FIG. 18A is a diagram illustrating the example of the contents of the processing result inquiring command. In FIG. 18A, the case of inquiring the processing result of the print job whose job tracing ID 1804 is indicated by "834fbf07-86d3-4226-93df-20f36c299844" is shown as an example. Further, a packet type (Packet Type) 1801, a request ID (ReqID) 1802, and an operation code (OpCode) 1803 exist in the processing result inquiring command. In the embodiment, the processing result of the print job is inquired by using the job tracing ID 1804.

FIG. 18B is a diagram illustrating the contents of the response to the processing result inquiring command illustrated in FIG. 18A. In FIG. 18B, the case where a response of the following contents is made as a processing result of the print job whose job tracing ID 1804 is indicated by "834fbf07-86d3-4226-93df-20f36c299844" is illustrated as an example. That is, in FIG. 18B, the case where a response showing that a processing result 1806 of the job is "OK (normal end)" and the number of printed sheets 1807 is equal to "3" is made as a processing result of the print job is illustrated as an example. There is also a case where, for example, the processing result of the print job is read out of the print history storing unit 28 constructed by using the non-volatile memory such as a hard disk in the network printer 105. The job tracing ID 1804, an intra-apparatus job ID 1805, the processing result 1806 of the job, and the number of printed sheets 1807 have been stored as one record per print job in the print history storing unit 28.

FIG. 19 is a flowchart for describing an example of a print job state recovering process. More specifically speaking, the print job state recovering process corresponds to, for example, a process which is executed in the case where the print control program of FIG. 6 is forcedly finished by an unexpected power-off of the print server 101 and, thereafter, the print control program is activated again. The process in FIG. 19 is called in an initializing process of the print control program 303 and executed in the job tracing unit 15.

First, in S1901, the job creation/deletion detecting unit 152 reads out information (job trace information) in the job trace information table stored in the job trace information storing unit 16.

Subsequently, in S1902, the job creation/deletion detecting unit 152 discriminates the presence or absence of the job trace information whose job state 84 indicates "transmitted". As a result of the discrimination, if the job trace information whose job state 84 indicates "transmitted" does not exist, the print job state recovering process is finished. It is also possible to construct in such a manner that with respect to the print job whose job state 84 does not indicate "transmitted", the system is set to a pause mode and the recovering process is executed.

If the job trace information whose job state 84 indicates "transmitted" exists, S1903 follows. In S1903, the job attribute polling unit 154 executes the polling process of the print job to the network printer 105 and obtains the information of the print job (for example, the attributes and the processing result of the print job).

Subsequently, in S1904, by using the job tracing ID as a key, the job creation/deletion detecting unit 152 discriminates whether or not the information of the print job obtained in S1903 exists in the job trace information table in the job trace information storing unit 16. As a result of the discrimination, if the information of the print job obtained in S1903 exists in the job trace information table in the job trace information storing unit 16, it is determined that the information of the print job which is being traced could be obtained, and S1905 follows. In S1905, the job creation/deletion detecting unit 152 updates the job trace information table (for example, the job state 84 or job attributes 85) illustrated in FIG. 8 based on the information of the print job obtained in S1903. The processing routine advances to S1907, which will be described hereinafter.

In this manner, in this embodiment, for example, in S1904, the CPU 200 of the print server 101 executes the print control program 303 in the FD 204 or the HD 205, so that the discriminating step is realized.

In S1904, if the information of the print job obtained in S1903 does not exist in the job trace information table in the job trace information storing unit 16, it is determined that the information of the print job which is being traced could not be obtained, and S1906 follows. The case where the discrimination result in S1904 indicates NO denotes that the process of S1510 described in FIG. 15 mentioned above is not executed before the PC is reactivated or the like. In S1906, the job creation/deletion detecting unit 152 adds the information of the print job obtained in S1903 as information of the unconfirmed print job to a list of the unconfirmed job information. Then, S1907 follows.

In S1907, the job creation/deletion detecting unit 152 discriminates whether or not the print result and the like have been confirmed with respect to all of the print jobs in each of which the job state 84 indicates "transmitted" in the job trace information table in the job trace information storing unit 16. That is, the job creation/deletion detecting unit 152 discriminates whether or not the processes of S1904 to S1906 have been executed with respect to all of the print jobs in each of which the job state 84 indicates "transmitted". As a result of the discrimination, if the print result and the like are not confirmed with respect to all of the print jobs in each of which the job state 84 indicates "transmitted", the processes of S1904 to S1907 are repetitively executed until the confirmation is completed.

If the confirmation has been made with respect to all of the print jobs in each of which the job state 84 indicates "transmitted", S1908 follows. In S1908, the job creation/deletion detecting unit 152 discriminates whether or not the list of the unconfirmed job information is empty, thereby discriminating the presence or absence of the unconfirmed print jobs. As a result of the discrimination, if the unconfirmed job information list is empty and there are no unconfirmed print jobs, the print job state recovering process is finished. If the unconfirmed job information list is not empty and the unconfirmed print jobs exist, S1909 follows. In S1909, the processing result inquiring unit 155 inquires a processing result from the network printer 105 and obtains a log of the printing process from the network printer 105. The network printer 105 in which the inquiry about the processing result in S1909 has been analyzed by the language analyzing unit 22 reads out response information from the print history storing unit 28 through the job managing unit 23. The network printer 105 transmits the read-out response information to the print server 101 through the status response processing unit 27 and responds to the inquiry about the processing result. In the embodiment, there are two commands for allowing the processing result inquiring unit 155 to inquire the processing result. One of them is the foregoing processing result inquiring command (Trace) (refer to FIGS. 18A and 18B) and the other is a log inquiring command (Log) which is used in the present flowchart. The processing result inquiring command (Trace) as an example of the first command is a command for individually (one by one) inquiring histories of the print jobs stored in the hard disk in the network printer 105. The log inquiring command (Log) as an example of the second command is a command for inquiring in a set the histories of the plurality of print jobs stored in the hard disk in the network printer 105.

Subsequently, in S1910, the job creation/deletion detecting unit 152 discriminates whether or not the print job registered in the job trace information table in the job trace information storing unit 16 exists in the log obtained in S1909. As a result of the discrimination, if the print job registered in the job trace information table in the job trace information storing unit 16 exists in the log obtained in S1909, S1911 follows. In S1911, the job creation/deletion detecting unit 152 records the processing result of the print job included in the log obtained in S1909 to a list of the printed jobs and leaves the history. The job creation/deletion detecting unit 152 deletes the information of the print job from the job trace information table in the job trace information storing unit 16 and the unconfirmed job information list. The printed job list is stored in, for example, the non-volatile memory in the print server 101.

If the print job registered in the job trace information table in the job trace information storing unit 16 does not exist in the log obtained in S1909, S1912 follows. In S1912, the job creation/deletion detecting unit 152 records the processing result of the print job as "obscure" to the printed job list and leaves the history. The job creation/deletion detecting unit 152 deletes the information of the relevant print job from the job trace information table in the job trace information storing unit 16 and the unconfirmed job information list.

Subsequently, in S1913, the job creation/deletion detecting unit 152 discriminates whether or not the unconfirmed job information list becomes empty, thereby discriminating whether or not the print result and the like have been confirmed with respect to all of the unconfirmed print jobs. As a result of the discrimination, if the unconfirmed job information list is not empty and the print result and the like are not confirmed with respect to all of the unconfirmed print jobs, the processes of S1910 to S1913 are repetitively executed until the confirmation is completed. If the unconfirmed job information list becomes empty and the print result and the like have been confirmed with respect to all of the unconfirmed print jobs, the job state recovering process is finished.

As mentioned above, when the state notification from the job management table of the network printer 105 cannot be obtained, it is determined that the print job has been extinguished from the network printer 105, the processing result of the relevant print job is inquired from the print history storing unit 28. Therefore, the print server 101 can certainly obtain the processing result of the print job while reducing the processing load of the network printer 105 without executing the operation in the related art for frequently inquiring the processing result of the print job from the print history storing unit 28.

The job tracing ID is stored into the non-volatile memories in both of the print server 101 and the network printer 105. Therefore, even if the print server 101 and the network printer 105 are reactivated, the print job which is being traced by the print server 101 can be recognized by both of the print server 101 and the network printer 105. Thus, the print server 101 can obtain the processing result of the print job as definitely as possible.

Further, in the case of tracing the print job stored in the network printer 105, the print server 101 instructs the execution of the relevant print job by using the job tracing ID for such a print job. Therefore, even in such a construction that the print server 101 instructs the execution of the print job stored in the network printer 105, the print server 101 can obtain the processing result of the print job as definitely as possible based on the job tracing ID.

Owing to the above construction, the timing for confirming the processing result can be properly controlled according to the situation of the network printer 105 and the print completion result can be efficiently confirmed at high precision.

Although the embodiment has been described with respect to the case, as an example, where after the log was obtained once (S1909), the processing result is confirmed with respect to each of the print jobs in the job trace information table has been described, it is not always necessary to use such a method. For example, the processing result inquiring commands (Trace) may be issued one by one for each of the print jobs in the job trace information table.

The processing result can be also inquired without executing the processes of S1903 to S1908.

In the case where there are a plurality of processing result inquiring commands as in the embodiment described above, each processing result inquiring command may have characteristics information. For example, the processing result inquiring commands which are used to inquire the processing result of the print job may be switched based on the number of print jobs whose processing results are inquired and the characteristics information allocated to each processing result inquiring command.

FIG. 20 is a diagram illustrating an example of a relation between the processing result inquiring command and the characteristics information. In FIG. 20, the case where a processing result inquiring command 2001 includes two commands consisting of a Trace command and a Log command is illustrated as an example. A time (required time) that is necessary for inquiring the processing result is equal to "1 second" for the Trace command and "10 seconds" for the Log command. The number of information of the print jobs which can be obtained by one inquiry as an example of an amount of information which can be obtained by one inquiry is equal to "1" for the Trace command and "100" for the Log command.

In FIG. 20, the number of information of the print jobs whose processing results are obtained is assumed to be N (N is a natural number). Thus, the required time that is necessary for inquiring the processing result is equal to N seconds for the Trace command. On the other hand, in the case of the Log command, the required time is equal to "10 seconds" until the number of information of the print jobs is equal to "100". Therefore, it is possible to decide that it is desirable to use the Trace command when N<10 (N≦10) and use the Log command when N≧10 (N>10). As mentioned above, according to the number of print jobs whose processing results are inquired from the network printer 105, any one of the plurality of processing result inquiring commands (Trace commands and Log commands) can be selected and transmitted to the network printer 105.

Second Embodiment

The foregoing first embodiment has been described with respect to the case, as an example, where the job tracing ID is used as a key and the processing result of the print job is traced. However, the job identifier serving as a key upon tracing the processing result of the print job is not limited to the job tracing ID. For example, the intra-apparatus job ID described in the first embodiment can be also used as a job identifier. An embodiment in the case of tracing the processing result of the print job by using the intra-apparatus job ID as a job identifier will be described hereinbelow with reference to FIG. 12.

First, the job tracing ID in each of FIGS. 8, 10, 11, 16, 17A, 17B, 18A, and 18B is replaced by the intra-apparatus job ID.

When the sequence process of FIG. 12 is executed, since the intra-apparatus job ID is used as a key, the processes of S1202 to S1203 and S1205 to S1205 in FIG. 12 can be omitted.

After processes of S1204 and S1207 to S1212 were executed in a manner similar to FIG. 12, the intra-apparatus job ID is returned from the network printer 105 in S1213. The print server 101 executes the tracing process of the processing result of the print job by using the intra-apparatus job ID as a key.

In a manner similar to FIG. 12, when a sequence process of FIG. 14 is executed, first, processes of S1402 and S1404 to S1405 are omitted and, thereafter, the intra-apparatus job ID obtained in S1408 is used as a key and the tracing process of the processing result of the print job is executed.

In a flowchart of FIG. 15, in S1507, whether or not the information of the print job which is being traced could be obtained is discriminated by using the intra-apparatus job ID as a key. In S1509, the job tracing ID 1804 illustrated in FIGS. 18A and 18B is replaced by the intra-apparatus job ID and the status is requested. At this time, a status response (FIG. 18B) using the intra-apparatus job ID as a key is returned from the network printer 105.

Also in a flowchart of FIG. 19, a discrimination in S1904 is performed by using the intra-apparatus job ID as a key. Also in S1909, the job tracing ID 1804 is replaced by the intra-apparatus job ID and the status is requested. Also at this time, the status response (FIG. 18B) using the intra-apparatus job ID as a key is returned from the network printer 105.

Also in the second embodiment as mentioned above, the print processing result can be more certainly obtained while reducing the processing load of the printer in a manner similar to the first embodiment.

Another Embodiment of the Invention

The units constructing the print managing apparatus and the processing steps of the print managing method in the embodiments of the invention mentioned above can be realized by a method whereby a program stored in a RAM, a ROM, or the like of a computer operates. Such a program and a computer-readable recording medium in which the program has been recorded are also incorporated in the invention.

The invention can be also embodied as, for example, a system, an apparatus, a method, a program, a storing medium, or the like. Specifically speaking, the invention can be also applied to a system constructed by a plurality of apparatuses or may be applied to an apparatus constructed by one equipment.

The invention also incorporates a case where a program of software for realizing the functions of the foregoing embodiments (in the embodiments, program corresponding to the sequence diagrams illustrated in FIGS. 12 and 14 and the flowcharts illustrated in FIGS. 13, 15, and 19) is supplied to a system or an apparatus directly or from a remote place and a computer of the system or apparatus reads out and executes program codes of the supplied program.

Therefore, the program codes themselves which are installed to the computer in order to realize the functions and processes of the invention by the computer also realize the invention. That is, the invention also incorporates the computer program itself to realize the functions and processes of the invention.

In such a case, the program may have a form of any one of an object code, a program which is executed by an interpreter, script data which is supplied to the OS, and the like so long as it has the functions of the program.

As recording media for supplying the program, for example, there are a floppy disk, a hard disk, an optical disk, a magnetooptic disk, an MO, a CD-ROM, a CD-R, a CD-RW, and the like. There are also a magnetic tape, a non-volatile memory card, a ROM, a DVD (DVD-ROM, DVD-R), and the like.

As another program supplying method, the program can be also supplied by a method whereby a client computer is connected to a Homepage of the Internet by using a browser of the client computer and the computer program itself of the invention is downloaded from the Homepage or a compressed file including an automatic installing function is downloaded to the recording medium such as a hard disk or the like.

The program supplying method can be also realized by a method whereby the program codes constructing the program of the invention are divided into a plurality of files and the files are downloaded from different Homepages. That is, a WWW server for allowing a plurality of users to download the program files for realizing the functions and processes of the invention by the computer is also incorporated in the invention.

The program supplying method can be also realized by a method whereby the program of the invention is encrypted and stored into a storing medium such as a CD-ROM or the like, such storing media are distributed to the users, the users who can satisfy predetermined conditions are allowed to download key information for decrypting the encryption from the Homepage through the Internet, and the encrypted program is executed by using the downloaded key information and installed into the computer.

The invention incorporates not only the case where the computer executes the read-out program, so that the functions of the embodiments mentioned above are realized but also the case where an OS or the like which is operating on the computer executes a part or all of actual processes based on instructions of the program and the functions of the embodiments mentioned above can be realized by those processes.

Further, the invention also incorporates the case where the program read out of the recording medium is written into a memory provided for a function expanding board inserted in the computer or a function expanding unit connected to the computer, and thereafter, a CPU or the like provided for the function expanding board or function expanding unit executes a part or all of actual processes based on instructions of the program and the functions of the embodiment mentioned above are realized by those processes.

The foregoing embodiments merely show specific examples upon embodying the invention and a technical idea of the invention is not limited by them. That is, the invention can be embodied by various forms without departing from the technical scope or main features of the invention.

Although the invention has been described above with respect to the several desirable embodiments, the invention is not limited to those embodiments but, naturally, many modifications and applications are possible within the scope of claims of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-343122, filed Dec. 20, 2006, which is hereby incorporated by reference herein in its entirety.

What is claimed is:

1. A print managing apparatus adapted to communicate with a printing apparatus which can provide notification of a state of a print job that is managed in a first memory and notification of a history of the print job that is managed in a second memory, comprising:
    a discriminating unit for discriminating whether or not a processing result of the print job could be obtained based on the state notification showing the state of the print job managed in the first memory; and
    a tracing unit for obtaining the job history as a processing result of the print job managed in the second memory if it is determined by the discriminating unit based on the state notification that the processing result of the print job cannot be obtained.

2. An apparatus according to claim 1, wherein the discriminating unit and the tracing unit are included in a print control unit, and
    when the print control unit is reactivated, the discrimination by the discriminating unit is performed.

3. An apparatus according to claim 1, further comprising:
    a display control unit for allowing display unit to display a list of such print jobs stored in the second memory of the printing apparatus;
    a forming unit for forming job tracing identification information when printing of such a print job on the displayed list is instructed; and
    a notifying unit for notifying the printing apparatus of the job tracing identification information formed by the forming unit,
    and wherein based on the state notification including the job tracing identification information, the discriminating unit discriminates whether or not the processing result of the print job could be obtained.

4. An apparatus according to claim 1, wherein the tracing unit is operable selectively to issue a number of first commands which each designate one print job or to issue a second command for obtaining the print histories of a plurality of print jobs in a set, according to the number of print jobs for which a print history stored in the second memory and serving as a processing result of the print job is to be obtained from the printing apparatus.

5. An apparatus according to claim 1, wherein the state notification is an event which is notified from the printing apparatus or a response to a polling to the printing apparatus.

6. A print managing apparatus which can communicate with a printing apparatus which can provide notification of a state of a print job that is managed in a first memory and notification of a history of the print job that is managed in a second memory, comprising:
    discriminating means for discriminating whether or not a processing result of the print job could be obtained based on the state notification showing the state of the print job managed in the first memory; and
    tracing means for obtaining the job history as a processing result of the print job managed in the second memory if it is determined by the discriminating means based on the state notification that the processing result of the print job cannot be obtained.

7. A print managing method which is executed by a print managing apparatus that can communicate with a printing apparatus, the printing apparatus being capable of providing notification of a state of a print job which is managed in a first memory and notification of a history of the print job that is managed in a second memory, comprising:
    discriminating whether or not a processing result of the print job could be obtained based on the state notification showing the state of the print job managed in the first memory; and obtaining the job history as a processing result of the print job managed in the second memory if it is determined based on the state notification that the processing result of the print job cannot be obtained.

8. A method according to claim 7, wherein the discrimination is performed following reactivation of a print control means which carries out the discriminating and tracing steps.

9. A method according to claim 7, further comprising:
    controlling the display unit to display a list of print jobs stored in the second memory of the printing apparatus;
    forming job tracing identification information when printing of a print job on the displayed list is instructed; and
    notifying the printing apparatus of the formed job tracing identification information,
    and wherein the discrimination of whether or not the processing result of the print job could be obtained is based on the state notification including the job tracing identification information.

10. A method according to claim 7, wherein in obtaining the job history, a number of first commands which each designate one print job or a second command for obtaining the print histories of a plurality of print jobs in a set are issued, according to the number of print jobs for which a print history stored in the second memory and serving as a processing result of the print job is to be obtained from the printing apparatus.

11. A method according to claim 7, wherein the state notification is an event which is notified from the printing apparatus or a response to a polling to the printing apparatus.

12. A computer-readable storage medium storing a program which is adapted to be executed by a computer in a print managing apparatus, the print managing apparatus being capable of communicating with a printing apparatus which can provide notification of a state of a print job which is managed in a first memory and notification of a history of the print job that is managed in a second memory, the program when executed causing the print managing apparatus to:
    discriminate whether or not a processing result of a print job could be obtained based on the state notification showing the state of the print job managed in the first memory; and
    obtain the job history as a processing result of the print job managed in the second memory if it is determined based on the state notification that the processing result of the print job cannot be obtained.

* * * * *